United States Patent
Le Guern et al.

(10) Patent No.: US 11,644,589 B2
(45) Date of Patent: May 9, 2023

(54) ANALOGUE FACILITATED SEISMIC DATA INTERPRETATION SYSTEM

(71) Applicant: Schlumberger Technology Corporation, Sugar Land, TX (US)

(72) Inventors: Pierre Le Guern, Tananger (NO); Marie Etchebes, Tananger (NO); Aicha Bounaim, Hafrsfjord (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 603 days.

(21) Appl. No.: 16/614,790

(22) PCT Filed: May 23, 2018

(86) PCT No.: PCT/US2018/034109
§ 371 (c)(1),
(2) Date: Nov. 18, 2019

(87) PCT Pub. No.: WO2018/217875
PCT Pub. Date: Nov. 29, 2018

(65) Prior Publication Data
US 2020/0158898 A1 May 21, 2020

Related U.S. Application Data

(60) Provisional application No. 62/509,743, filed on May 23, 2017.

(51) Int. Cl.
*G01V 1/28* (2006.01)
*G01V 1/34* (2006.01)

(52) U.S. Cl.
CPC .............. *G01V 1/282* (2013.01); *G01V 1/345* (2013.01); *G01V 2210/614* (2013.01); *G01V 2210/64* (2013.01); *G01V 2210/665* (2013.01)

(58) Field of Classification Search
CPC .. G01V 1/282; G01V 1/345; G01V 2210/614; G01V 2210/64; G01V 2210/665
See application file for complete search history.

(56) References Cited

U.S. PATENT DOCUMENTS

| | | | |
|---|---|---|---|
| 6,549,854 B1 | 4/2003 | Malinverno et al. | |
| 10,436,927 B2 * | 10/2019 | Sun | G01V 1/364 |

(Continued)

FOREIGN PATENT DOCUMENTS

| | | |
|---|---|---|
| WO | 2010/090825 A2 | 8/2010 |
| WO | 2016/154404 A1 | 9/2016 |
| WO | 2020264479 A1 | 12/2020 |

OTHER PUBLICATIONS

Casini et al., "Fracture characterization and modeling from virtual outcrops," AAPG Bulletin, Jan. 1, 2016, vol. 100, No. 1, pp. 41-61.
(Continued)

*Primary Examiner* — Elias Desta

(57) ABSTRACT

A method can include acquiring imagery of an exposed surface of the Earth; generating a multi-dimensional model based at least in part on the imagery; generating synthetic seismic data utilizing the multi-dimensional model; acquiring seismic data of a subsurface region of the Earth; performing a search that matches a portion of the acquired seismic data and a portion of the synthetic seismic data; and characterizing the subsurface region of the Earth based at least in part on the portion of the synthetic seismic data.

18 Claims, 22 Drawing Sheets

(56) References Cited

U.S. PATENT DOCUMENTS

| | | | |
|---|---|---|---|
| 2007/0203673 A1* | 8/2007 | Sherrill | G01V 1/30 |
| | | | 702/14 |
| 2009/0319243 A1 | 12/2009 | Suarez-Rivera et al. | |
| 2010/0177595 A1 | 7/2010 | Khare et al. | |
| 2010/0257004 A1 | 10/2010 | Perlmutter | |
| 2011/0090760 A1* | 4/2011 | Rickett | G01V 1/282 |
| | | | 367/73 |
| 2013/0179080 A1 | 7/2013 | Skalinski et al. | |
| 2013/0282349 A1 | 10/2013 | Gorell | |
| 2014/0222403 A1 | 8/2014 | Lepage et al. | |
| 2014/0379317 A1 | 12/2014 | Sanden et al. | |
| 2015/0253443 A1 | 9/2015 | Hornbostel et al. | |

OTHER PUBLICATIONS

International Search Report and Written Opinion for the International patent application PCT/US2016/034109 dated Sep. 4, 2018.
International Preliminary Report on Patentability for the International patent application PCT/US2016/034109 dated Dec. 5, 2019.
Hopkins, C., "Virtual Reality Geology Field Trips," GEOExPro, Mar. 2019, vol. 16, No. 1, accessed via the Internet on Dec. 5, 2021 https://www.geoexpro.com/articles/2019/virtual-reality-geology-field-trips, 8 pages.
International Preliminary Report on Patentability of International Patent Application No. PCT/US2018/034109 dated Dec. 5, 2019.
International Search Report and Written Opinion of International Patent Application No. PCT/US2020/040072, dated Aug. 21, 2020, 10 pages.
International Preliminary Report on Patentability of International Patent Application No. PCT/US2020/040072 dated Jan. 6, 2022, 7 pages.

* cited by examiner

ANALOGUE FACILITATED SEISMIC DATA INTERPRETATION SYSTEM

RELATED APPLICATION

This application claims priority to and the benefit of a U.S. Provisional Application having Ser. No. 62/509,743, filed 23 May 2017, which is incorporated by reference herein.

BACKGROUND

An analogue can be an example of an exposed structure that is used for comparison to a subterranean structure (e.g., not exposed at the surface of the Earth). In oil and gas exploration, geoscientists and engineers may compare subterranean structures with surface exposures deemed analogs where they may be thought to be similar in depositional environment and reservoir character to the subterranean structures. Such comparisons may be part of an interpretation process and based on direct visual comparisons of surface imagery to a stratigraphic model (e.g., a layer cake type of model, etc.) of a subterranean region. For example, layers seen in a surface image of an outcrop rendered to a display may be visually compared to layers seen in a stratigraphic model rendered to a display. An outcrop can be a body of rock exposed at the surface of the Earth, which may be exposed naturally or due to one or more human actions (e.g., construction of a highway, construction of a railroad, open pit mining, etc.).

In oil and gas exploration, interpretation is a process that involves analysis of data to identify and locate various subsurface structures (e.g., horizons, faults, geobodies, etc.) in a geologic environment. Various types of structures (e.g., stratigraphic formations) may be indicative of hydrocarbon traps or flow channels, as may be associated with one or more reservoirs (e.g., fluid reservoirs). In the field of resource extraction, enhancements to interpretation can allow for construction of a more accurate model of a subsurface region, which, in turn, may improve characterization of the subsurface region for purposes of resource extraction. Characterization of one or more subsurface regions in a geologic environment can guide, for example, performance of one or more operations (e.g., field operations, etc.). As an example, a more accurate model of a subsurface region may make a drilling operation more accurate as to a borehole's trajectory where the borehole is to have a trajectory that penetrates a reservoir, etc.

SUMMARY

A method can include acquiring imagery of an exposed surface of the Earth; generating a multi-dimensional model based at least in part on the imagery; generating synthetic seismic data utilizing the multi-dimensional model; acquiring seismic data of a subsurface region of the Earth; performing a search that matches a portion of the acquired seismic data and a portion of the synthetic seismic data; and characterizing the subsurface region of the Earth based at least in part on the portion of the synthetic seismic data. A system can include a processor; memory operatively coupled to the processor; and processor-executable instructions stored in the memory to instruct the system to: acquire imagery of an exposed surface of the Earth; generate a multi-dimensional model based at least in part on the imagery; generate synthetic seismic data utilizing the multi-dimensional model; acquire seismic data of a subsurface region of the Earth; perform a search that matches a portion of the acquired seismic data and a portion of the synthetic seismic data; and characterize the subsurface region of the Earth based at least in part on the portion of the synthetic seismic data. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

This description is not to be taken in a limiting sense, but rather is made merely for the purpose of describing the general principles of the implementations. The scope of the described implementations should be ascertained with reference to the issued claims.

Figure 1:
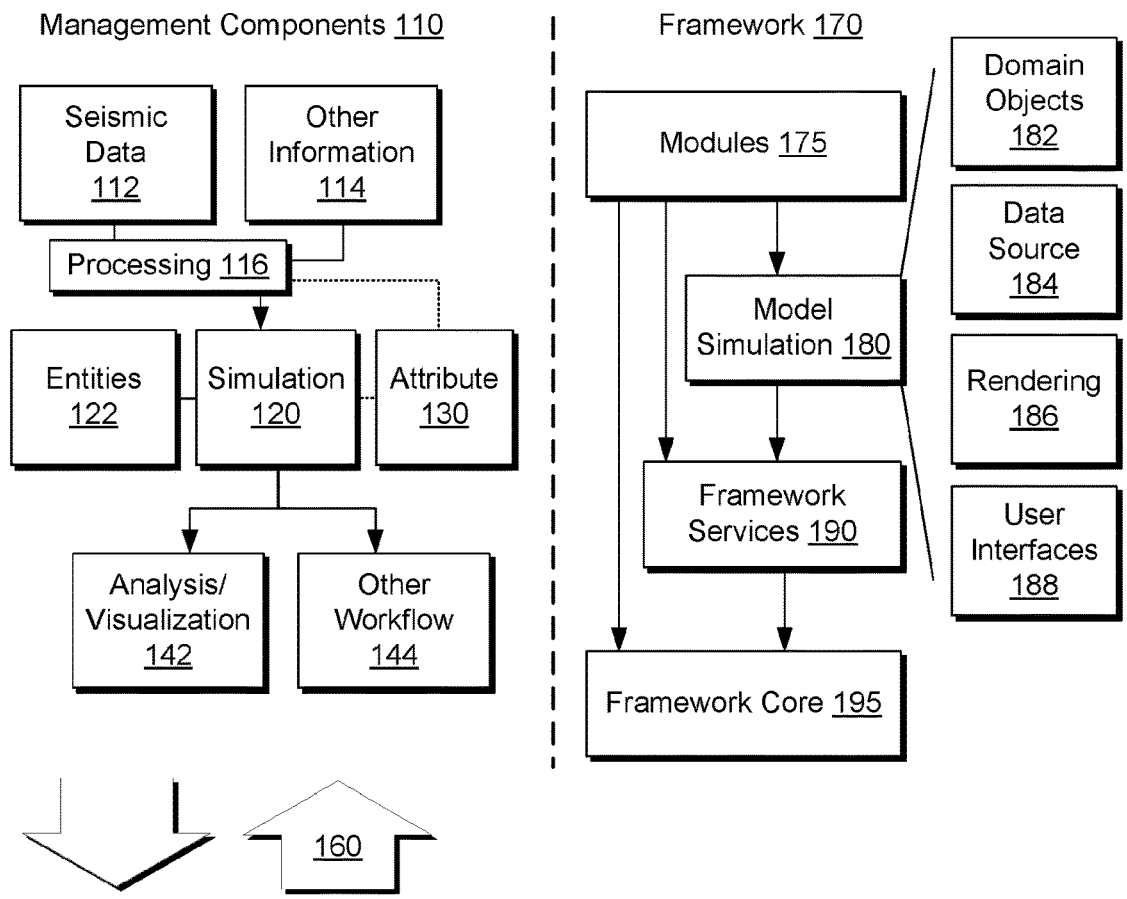
FIG. 1 illustrates an example system that includes various components for modeling a geologic environment and various equipment associated with the geologic environment.
Figure 1:
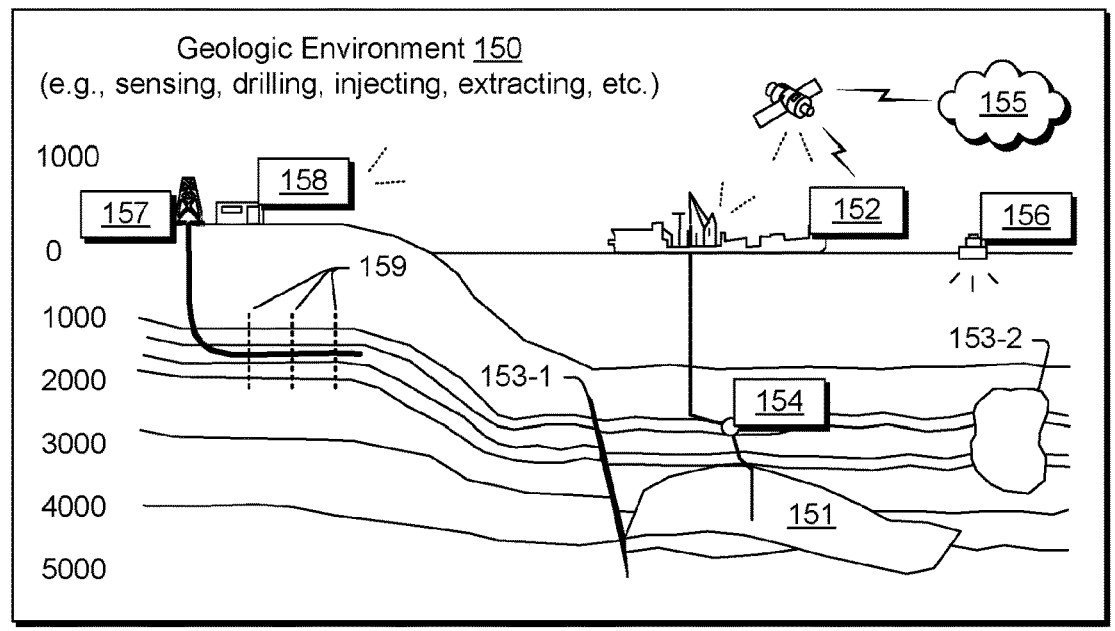

FIG. 1 shows an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. An example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the OCEAN® framework where the model simulation layer 180 is the PETREL® model-centric software package that hosts OCEAN® framework applications. In an example embodiment, the PETREL® software may be considered a data-driven application. The PETREL® software can include a framework for model building and visualization.

As an example, seismic data may be processed using a framework such as the OMEGA® framework (Schlumberger Limited, Houston, Tex.). The OMEGA® framework provides features that can be implemented for processing of seismic data, for example, through prestack seismic interpretation and seismic inversion. A framework may be scalable such that it enables processing and imaging on a single workstation, on a massive compute cluster, etc. As an example, one or more techniques, technologies, etc. described herein may optionally be implemented in conjunction with a framework such as, for example, the OMEGA® framework.

A framework for processing data may include features for 2D line and 3D seismic surveys. Modules for processing seismic data may include features for prestack seismic interpretation (PSI), optionally pluggable into a framework such as the OCEAN® framework. A workflow may be specified to include processing via one or more frameworks, plug-ins, add-ons, etc. A workflow may include quantitative interpretation, which may include performing pre- and post-stack seismic data conditioning, inversion (e.g., seismic to properties and properties to synthetic seismic), wedge modeling for thin-bed analysis, amplitude versus offset (AVO) and amplitude versus angle (AVA) analysis, reconnaissance, etc. As an example, a workflow may aim to output rock properties based at least in part on processing of seismic data. As an example, various types of data may be processed to provide one or more models (e.g., earth models). For example, consider processing of one or more of seismic data, well data, electromagnetic and magnetic telluric data, reservoir data, etc.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
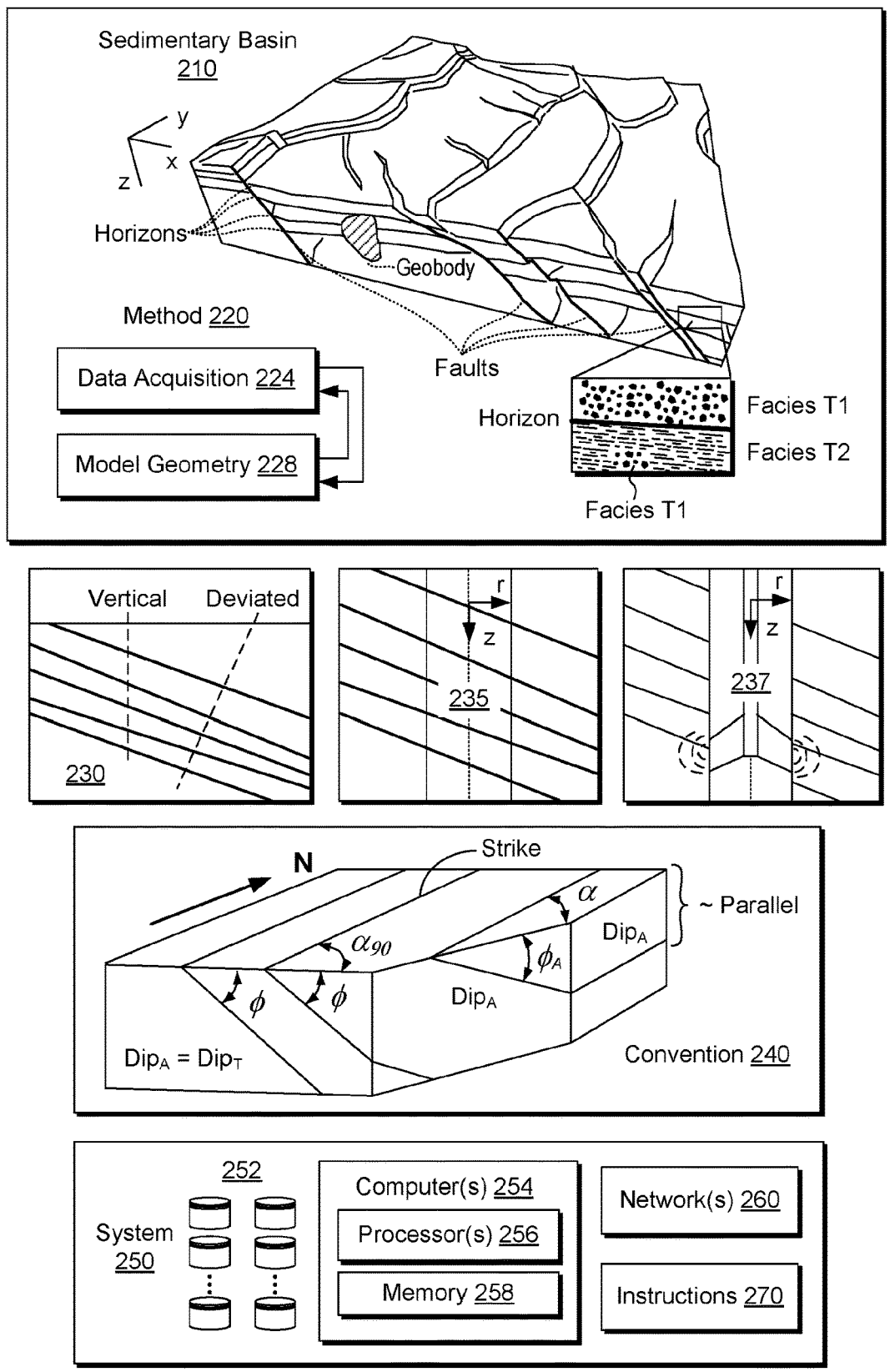
FIG. 2 illustrates an example of a sedimentary basin, an example of a method, an example of a formation, an example of a borehole, an example of a borehole tool, an example of a convention and an example of a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1. One or more operations may be performed in an environment based at least in part on such characterization of a subsurface environment or environments (e.g., via acquired data, simulation, modeling, etc.).

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, a borehole may be vertical, deviate and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the TECHLOG® framework (Schlumberger Limited, Houston, Tex.). The TECHLOG® framework includes: core systems features such as BASE, C-Data-API, CoreDB, Real Time, TechData-Plus, TechStat, and Viewer; geology features such as Advanced Plotting, Field Map, Ipsom, K. mod, and Wellbore Imaging (Wbi); geomechanics features such as Completion Geomechanics, Pore Pressure Prediction, and Wellbore Stability; geophysics features such as Acoustics and Geophy; petrophysics features such as 3D Petrophysics, Acoustics, Nuclear Magnetic Resonance (NMR), Quanti., Quanti. Elan, TechCore and Thin Bed Analysis (TBA); production features such as Cased Hole, Production Logging, and Wellbore Integrity; reservoir engineering features such as Fluid Contact, Formation Pressure, Saturation-Height Modeling (SHM), and TechCore; and shale features such as Unconventionals and Quanti. Elan.

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles θ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $\text{Dip}_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $\text{Dip}_A$ in the convention 240 of FIG. 2). Apparent dip may be the dip of a plane as measured in any other direction except in the direction of true dip (see, e.g., $\phi_A$ as $\text{Dip}_A$ for angle α); however, it is possible that the apparent dip is equal to the true dip (see, e.g., $\phi$ as $\text{Dip}_A=\text{Dip}_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with $\phi$ as $\text{Dip}_A=\text{Dip}_T$ for angle $\alpha_{90}$ with respect to the strike). As indicated, dip observed in a cross-section in any other direction is apparent dip (see, e.g., surfaces labeled $\text{Dip}_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Data-based interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more sets of instructions 270. As to the one or more computers 254, each computer may include one or more processors (e.g., or processing cores) 256 and memory 258 for storing instructions (e.g., one or more of the one or more sets of instructions 270), for example, executable by at least one of the one or more processors 256. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more sets of instructions 270 may include instructions (e.g., stored in the memory 258) executable by one or more processors of the one or more processors 256 to instruct the system 250 to perform various actions. As an example, the system 250 may be configured such that the one or more sets of instructions 270 provide for establishing the framework 170 of FIG. 1 or a portion thereof. As an example, one or more methods, techniques, etc. may be performed using one or more sets of instructions, which may be, for example, one or more of the one or more sets of instructions 270 of FIG. 2.

As mentioned, seismic data may be acquired and analyzed to understand better subsurface structure of a geologic environment. Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than about 1 Hz and/or optionally more than about 100 Hz). Seismic data may be processed and interpreted, for example, to understand better composition, fluid content, extent and geometry of subsurface rocks.

Figure 3:
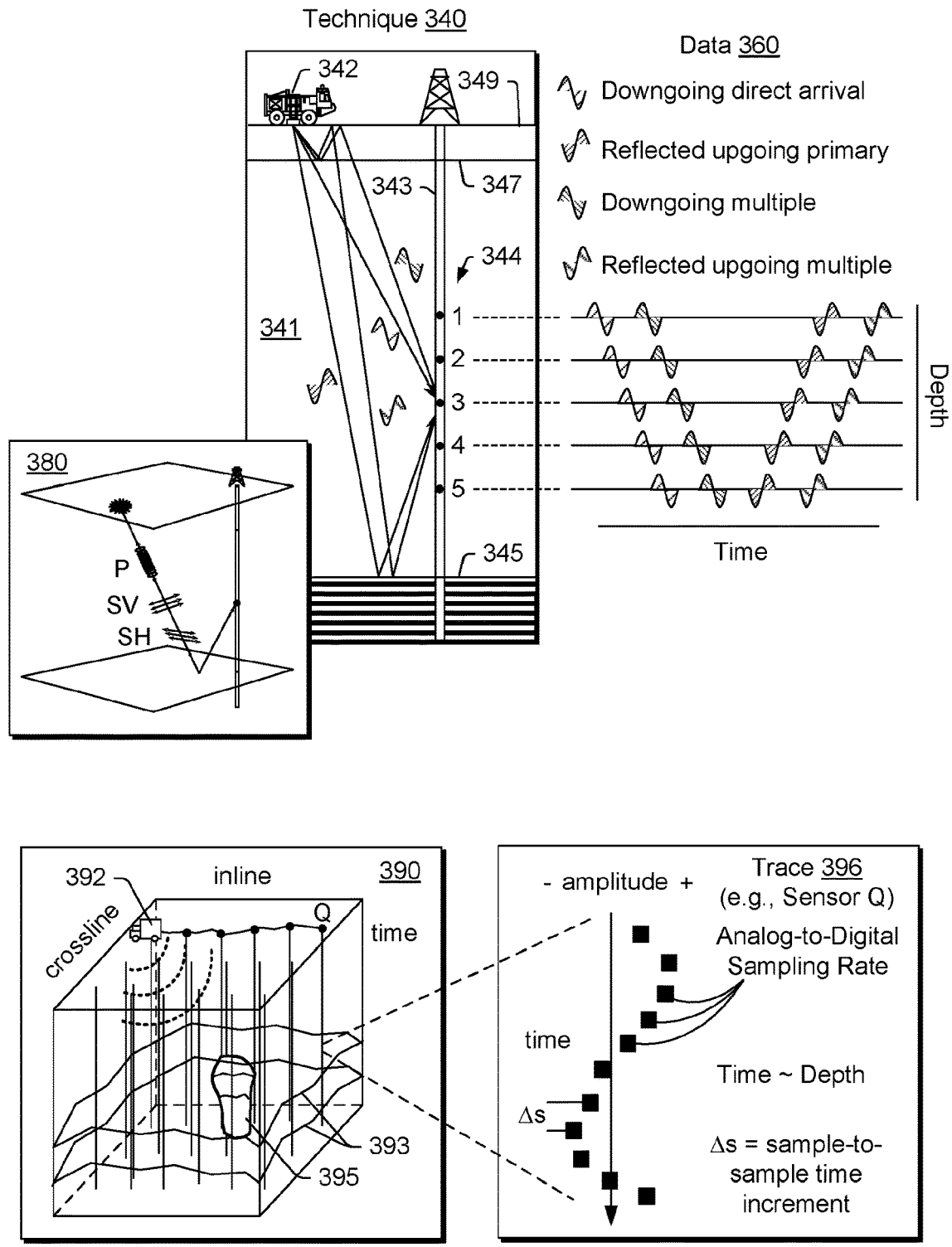
FIG. 3 illustrates an example of a technique that may acquire data.

FIG. 3 shows an example of an acquisition technique 340 to acquire seismic data (see, e.g., data 360). As an example, a system may process data acquired by the technique 340, for example, to allow for direct or indirect management of sensing, drilling, injecting, extracting, etc., with respect to a geologic environment. In turn, further information about the geologic environment may become available as feedback (e.g., optionally as input to the system). As an example, an operation may pertain to a reservoir that exists in a geologic environment such as, for example, a reservoir. As an example, a technique may provide information (e.g., as an output) that may specifies one or more location coordinates of a feature in a geologic environment, one or more characteristics of a feature in a geologic environment, etc.

In FIG. 3, the technique 340 may be implemented with respect to a geologic environment 341. As shown, an energy source (e.g., a transmitter) 342 may emit energy where the energy travels as waves that interact with the geologic environment 341. As an example, the geologic environment 341 may include a bore 343 where one or more sensors (e.g., receivers) 344 may be positioned in the bore 343. As an example, energy emitted by the energy source 342 may interact with a layer (e.g., a structure, an interface, etc.) 345 in the geologic environment 341 such that a portion of the energy is reflected, which may then be sensed by one or more of the sensors 344. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 341 is shown as including a layer 347 that resides below a surface layer 349. Given such an environment and arrangement of the source 342 and the one or more sensors 344, energy may be sensed as being associated with particular types of waves.

As an example, seismic data may include evidence of an interbed multiple from bed interfaces, evidence of a multiple from a water interface (e.g., an interface of a base of water and rock or sediment beneath it) or evidence of a multiple from an air-water interface, etc.

As shown in FIG. 3, the acquired data 360 can include data associated with downgoing direct arrival waves, reflected upgoing primary waves, downgoing multiple reflected waves and reflected upgoing multiple reflected waves. The acquired data 360 is also shown along a time axis and a depth axis. As indicated, in a manner dependent at least in part on characteristics of media in the geologic environment 341, waves travel at velocities over distances such that relationships may exist between time and space. Thus, time information, as associated with sensed energy, may allow for understanding spatial relations of layers, interfaces, structures, etc. in a geologic environment.

FIG. 3 also shows a diagram 380 that illustrates various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that can characterize anisotropy of media (e.g., seismic anisotropy, etc.), consider the Thomsen parameters $\varepsilon$, $\delta$ and $\gamma$. The Thomsen parameter $\delta$ can describe offset effects (e.g., short offset). As to the Thomsen parameter $\varepsilon$, it can describe offset effects (e.g., a long offset) and can relate to a difference between vertical and horizontal compressional waves (e.g., P or P-wave or quasi compressional wave qP or qP-wave). As to the Thomsen parameter $\gamma$, it can describe a shear wave effect. For example, consider an effect as to a horizontal shear wave with horizontal polarization to a vertical shear wave.

As an example, an inversion technique may be applied to generate a model that may include one or more parameters such as one or more of the Thomsen parameters. For example, one or more types of data may be received and used in solving an inverse problem that outputs a model (e.g., a reflectivity model, an impedance model, a fluid flow model, etc.).

In the example of FIG. 3, a diagram 390 shows acquisition equipment 392 emitting energy from a source (e.g., a transmitter) and receiving reflected energy via one or more sensors (e.g., receivers) strung along an inline direction. As the region includes layers 393 and, for example, the geobody 395, energy emitted by a transmitter of the acquisition equipment 392 can reflect off the layers 393 and the geobody 395. Evidence of such reflections may be found in the acquired traces. As to the portion of a trace 396, energy received may be discretized by an analog-to-digital converter that operates at a sampling rate. For example, the acquisition equipment 392 may convert energy signals sensed by sensor Q to digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

A 4D seismic survey involves acquisition of 3D seismic data at different times over a particular area. Such an approach can allow for assessing changes in a producing hydrocarbon reservoir with respect to time. As an example, changes may be observed in one or more of fluid location and saturation, pressure and temperature. 4D seismic data can be considered to be a form of time-lapse seismic data.

As an example, a seismic survey and/or other data acquisition may be for onshore and/or offshore geologic environments. As to offshore, streamers, seabed cables, nodes and/or other equipment may be utilized. As an example, nodes can be utilized as an alternative and/or in addition to seabed cables, which have been installed in several fields to acquire 4D seismic data. Nodes can be deployed to acquire seismic data (e.g., 4D seismic data) and can be retrievable after acquisition of the seismic data. As an example, a 4D seismic survey may call for one or more processes aimed at repeatability of data. A 4D survey can include two phases: a baseline survey phase and a monitor survey phase.

As an example, seismic data may be processed in a technique called "depth imaging" to form an image (e.g., a depth image) of reflection amplitudes in a depth domain for a particular target structure (e.g., a geologic subsurface region of interest).

As an example, seismic data may be processed to obtain an elastic model pertaining to elastic properties of a geologic subsurface region. For example, consider elastic properties such as density, compressional (P) impedance, compression velocity ($v_p$)-to-shear velocity ($v_s$) ratio, anisotropy, etc. As an example, an elastic model can provide various insights as to a surveyed region's lithology, reservoir quality, fluids, etc.

Figure 4:
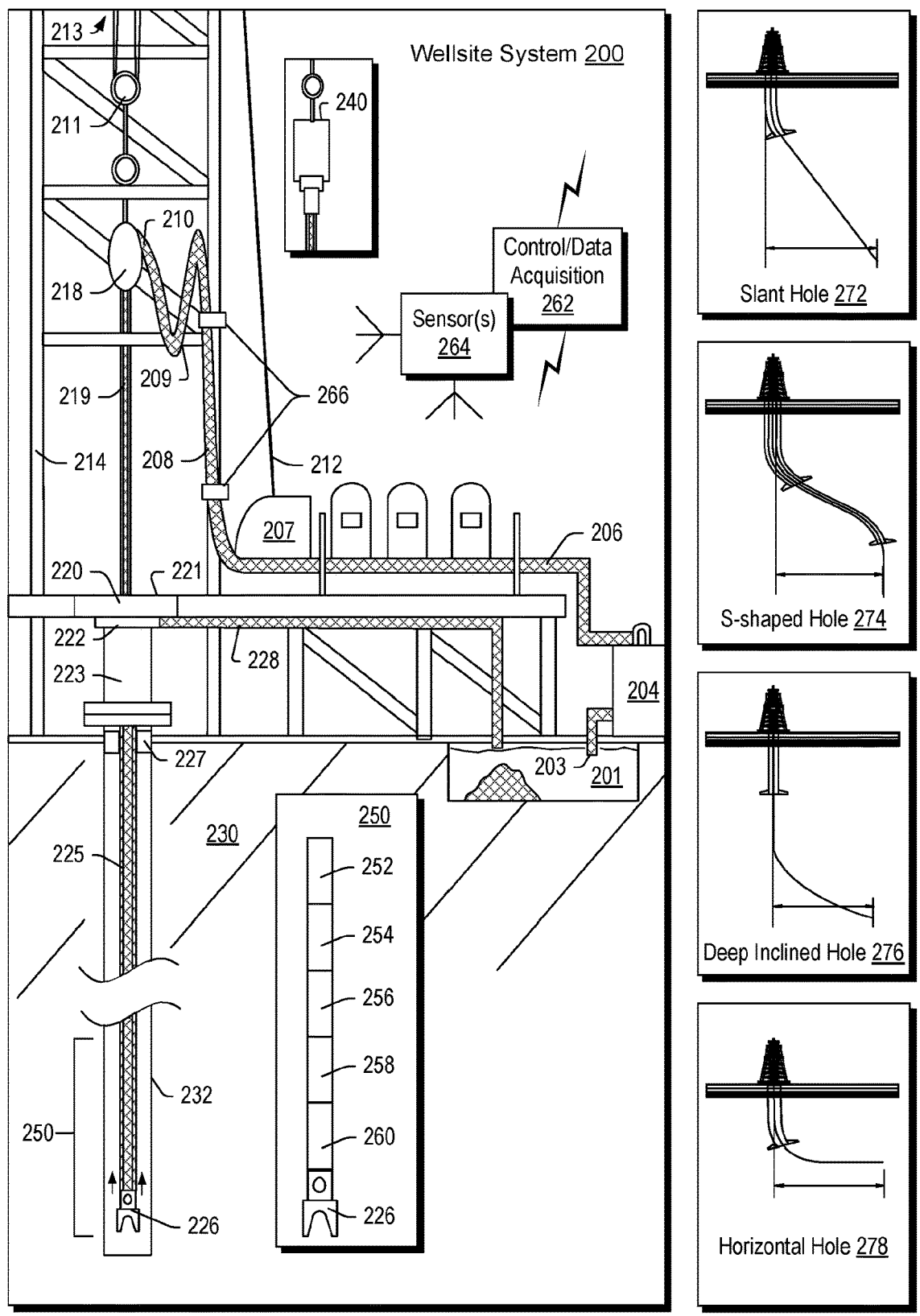
FIG. 4 illustrates examples of equipment including examples of downhole tools and examples of bores.

FIG. 4 shows an example of a wellsite system 400 (e.g., at a wellsite that may be onshore or offshore). As shown, the wellsite system 400 can include a mud tank 401 for holding mud and other material (e.g., where mud can be a drilling fluid), a suction line 403 that serves as an inlet to a mud pump 404 for pumping mud from the mud tank 401 such that mud flows to a vibrating hose 406, a drawworks 407 for winching drill line or drill lines 412, a standpipe 408 that receives mud from the vibrating hose 406, a kelly hose 409 that receives mud from the standpipe 408, a gooseneck or goosenecks 410, a traveling block 411, a crown block 413 for carrying the traveling block 411 via the drill line or drill lines 412, a derrick 414, a kelly 418 or a top drive 440, a kelly drive bushing 419, a rotary table 420, a drill floor 421, a bell nipple 422, one or more blowout preventors (BOPs) 423, a drillstring 425, a drill bit 426, a casing head 427 and a flow pipe 428 that carries mud and other material to, for example, the mud tank 401.

In the example system of FIG. 4, a borehole 432 is formed in subsurface formations 430 by rotary drilling; noting that various example embodiments may also use directional drilling.

As shown in the example of FIG. 4, the drillstring 425 is suspended within the borehole 432 and has a drillstring assembly 450 that includes the drill bit 426 at its lower end. As an example, the drillstring assembly 450 may be a bottom hole assembly (BHA).

The wellsite system 400 can provide for operation of the drillstring 425 and other operations. As shown, the wellsite system 400 includes the platform 411 and the derrick 414 positioned over the borehole 432. As mentioned, the wellsite system 400 can include the rotary table 420 where the drillstring 425 pass through an opening in the rotary table 420.

As shown in the example of FIG. 4, the wellsite system 400 can include the kelly 418 and associated components, etc., or a top drive 440 and associated components. As to a kelly example, the kelly 418 may be a square or hexagonal metal/alloy bar with a hole drilled therein that serves as a mud flow path. The kelly 418 can be used to transmit rotary motion from the rotary table 420 via the kelly drive bushing 419 to the drillstring 425, while allowing the drillstring 425 to be lowered or raised during rotation. The kelly 418 can pass through the kelly drive bushing 419, which can be driven by the rotary table 420. As an example, the rotary table 420 can include a master bushing that operatively couples to the kelly drive bushing 419 such that rotation of the rotary table 420 can turn the kelly drive bushing 419 and hence the kelly 418. The kelly drive bushing 419 can include an inside profile matching an outside profile (e.g., square, hexagonal, etc.) of the kelly 418; however, with slightly larger dimensions so that the kelly 418 can freely move up and down inside the kelly drive bushing 419.

As to a top drive example, the top drive 440 can provide functions performed by a kelly and a rotary table. The top drive 440 can turn the drillstring 425. As an example, the top drive 440 can include one or more motors (e.g., electric and/or hydraulic) connected with appropriate gearing to a short section of pipe called a quill, that in turn may be screwed into a saver sub or the drillstring 425 itself. The top drive 440 can be suspended from the traveling block 411, so the rotary mechanism is free to travel up and down the derrick 414. As an example, a top drive 440 may allow for drilling to be performed with more joint stands than a kelly/rotary table approach.

In the example of FIG. 4, the mud tank 401 can hold mud, which can be one or more types of drilling fluids. As an example, a wellbore may be drilled to produce fluid, inject fluid or both (e.g., hydrocarbons, minerals, water, etc.).

In the example of FIG. 4, the drillstring 425 (e.g., including one or more downhole tools) may be composed of a series of pipes threadably connected together to form a long tube with the drill bit 426 at the lower end thereof. As the drillstring 425 is advanced into a wellbore for drilling, at some point in time prior to or coincident with drilling, the mud may be pumped by the pump 404 from the mud tank 401 (e.g., or other source) via a the lines 406, 408 and 409 to a port of the kelly 418 or, for example, to a port of the top drive 440. The mud can then flow via a passage (e.g., or passages) in the drillstring 425 and out of ports located on the drill bit 426 (see, e.g., a directional arrow). As the mud exits the drillstring 425 via ports in the drill bit 426, it can then circulate upwardly through an annular region between an outer surface(s) of the drillstring 425 and surrounding wall(s) (e.g., open borehole, casing, etc.), as indicated by directional arrows. In such a manner, the mud lubricates the drill bit 426 and carries heat energy (e.g., frictional or other energy) and formation cuttings to the surface where the mud (e.g., and cuttings) may be returned to the mud tank 401, for example, for recirculation (e.g., with processing to remove cuttings, etc.).

The mud pumped by the pump 404 into the drillstring 425 may, after exiting the drillstring 425, form a mudcake that lines the wellbore which, among other functions, may reduce friction between the drillstring 425 and surrounding wall(s) (e.g., borehole, casing, etc.). A reduction in friction may facilitate advancing or retracting the drillstring 425. During a drilling operation, the entire drill string 425 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 426 of the drill string 425 at a bottom of a wellbore, pumping of the mud commences to lubricate the drill bit 426 for purposes of drilling to enlarge the wellbore. As mentioned, the mud can be pumped by the pump 404 into a passage of the drillstring 425 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 425) may be transmitted uphole to an uphole device, which may relay such information to other equipment for processing, control, etc.

As an example, telemetry equipment may operate via transmission of energy via the drillstring 425 itself. For example, consider a signal generator that imparts coded energy signals to the drillstring 425 and repeaters that may receive such energy and repeat it to further transmit the coded energy signals (e.g., information, etc.).

As an example, the drillstring 425 may be fitted with telemetry equipment 452 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 4, an uphole control and/or data acquisition system 462 may include circuitry to sense pressure pulses generated by telemetry equipment 452 and, for example, communicate sensed pressure pulses or information derived therefrom for process, control, etc.

The assembly 450 of the illustrated example includes a logging-while-drilling (LWD) module 454, a measuring-while-drilling (MWD) module 456, an optional module 458, a roto-steerable system and motor 460, and the drill bit 426.

The LWD module 454 may be housed in a suitable type of drill collar and can contain one or a plurality of selected types of logging tools. It will also be understood that more than one LWD and/or MWD module can be employed, for example, as represented at by the module 456 of the drillstring assembly 450. Where the position of an LWD module is mentioned, as an example, it may refer to a module at the position of the LWD module 454, the module 456, etc. An LWD module can include capabilities for measuring, processing, and storing information, as well as for communicating with the surface equipment. In the illustrated example, the LWD module 454 may include a seismic measuring device.

The MWD module 456 may be housed in a suitable type of drill collar and can contain one or more devices for measuring characteristics of the drillstring 425 and the drill bit 426. As an example, the MWD tool 454 may include equipment for generating electrical power, for example, to power various components of the drillstring 425. As an example, the MWD tool 454 may include the telemetry equipment 452, for example, where the turbine impeller can generate power by flow of the mud; it being understood that other power and/or battery systems may be employed for purposes of powering various components. As an example, the MWD module 456 may include one or more of the following types of measuring devices: a weight-on-bit measuring device, a torque measuring device, a vibration measuring device, a shock measuring device, a stick slip measuring device, a direction measuring device, and an inclination measuring device.

FIG. 4 also shows some examples of types of holes that may be drilled. For example, consider a slant hole 472, an S-shaped hole 474, a deep inclined hole 476 and a horizontal hole 478.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 4, the wellsite system 400 can include one or more sensors 464 that are operatively coupled to the control and/or data acquisition system 462. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 400. As an example, a sensor or sensor may be at an offset wellsite where the wellsite system 400 and the offset wellsite are in a common field (e.g., oil and/or gas field).

As an example, one or more of the sensors 464 can be provided for tracking pipe, tracking movement of at least a portion of a drillstring, etc.

As an example, the system 400 can include one or more sensors 466 that can sense and/or transmit signals to a fluid conduit such as a drilling fluid conduit (e.g., a drilling mud conduit). For example, in the system 400, the one or more sensors 466 can be operatively coupled to portions of the standpipe 408 through which mud flows. As an example, a downhole tool can generate pulses that can travel through the mud and be sensed by one or more of the one or more sensors 466. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 400 can include a transmitter that can generate signals that can be transmitted downhole via mud (e.g., drilling fluid) as a transmission medium.

Figure 5:
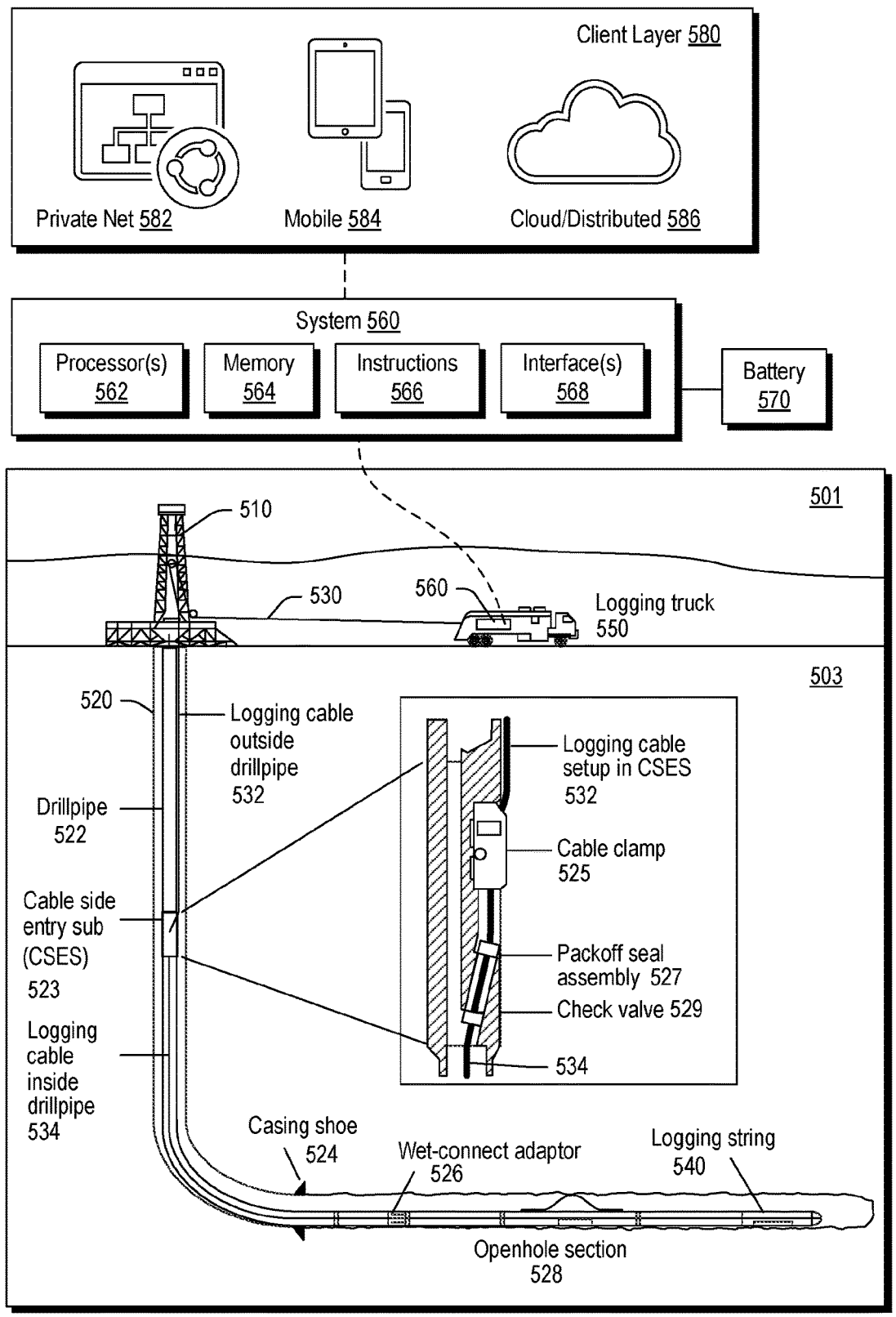
FIG. 5 illustrates examples of equipment including examples of downhole tools.

FIG. 5 shows an example of an environment 501 that includes a subterranean portion 503 where a rig 510 is positioned at a surface location above a bore 520. In the example of FIG. 5, various wirelines services equipment can be operated to perform one or more wirelines services including, for example, acquisition of data from one or more positions within the bore 520.

In the example of FIG. 5, the bore 520 includes drillpipe 522, a casing shoe, a cable side entry sub (CSES) 523, a wet-connector adaptor 526 and an openhole section 528. As an example, the bore 520 can be a vertical bore or a deviated bore where one or more portions of the bore may be vertical and one or more portions of the bore may be deviated, including substantially horizontal.

In the example of FIG. 5, the CSES 523 includes a cable clamp 525, a packoff seal assembly 527 and a check valve 529. These components can provide for insertion of a logging cable 530 that includes a portion 532 that runs outside the drillpipe 522 to be inserted into the drillpipe 522 such that at least a portion 534 of the logging cable runs inside the drillpipe 522. In the example of FIG. 5, the logging cable 530 runs past the wet-connect adaptor 526 and into the openhole section 528 to a logging string 540.

As shown in the example of FIG. 5, a logging truck 550 (e.g., a wirelines services vehicle) can deploy the wireline 530 under control of a system 560. As shown in the example of FIG. 5, the system 560 can include one or more processors 562, memory 564 operatively coupled to at least one of the one or more processors 562, instructions 566 that can be, for example, stored in the memory 564, and one or more interfaces 568. As an example, the system 560 can include one or more processor-readable media that include processor-executable instructions executable by at least one of the one or more processors 562 to cause the system 560 to control one or more aspects of equipment of the logging string 540 and/or the logging truck 550. In such an example, the memory 564 can be or include the one or more processor-readable media where the processor-executable instructions can be or include instructions. As an example, a processor-readable medium can be a computer-readable storage medium that is not a signal and that is not a carrier wave.

FIG. 5 also shows a battery 570 that may be operatively coupled to the system 560, for example, to power the system 560. As an example, the battery 570 may be a back-up battery that operates when another power supply is unavailable for powering the system 560 (e.g., via a generator of the wirelines truck 550, a separate generator, a power line, etc.). As an example, the battery 570 may be operatively coupled to a network, which may be a cloud network. As an example, the battery 570 can include smart battery circuitry and may be operatively coupled to one or more pieces of equipment via a SMBus or other type of bus.

As an example, the system 560 can be operatively coupled to a client layer 580. In the example of FIG. 5, the client layer 580 can include features that allow for access and interactions via one or more private networks 582, one or more mobile platforms and/or mobile networks 584 and via the "cloud" 586, which may be considered to include distributed equipment that forms a network such as a network of networks. As an example, the system 560 can include circuitry to establish a plurality of connections (e.g., sessions). As an example, connections may be via one or more types of networks. As an example, connections may be client-server types of connections where the system 560 operates as a server in a client-server architecture. For example, clients may log-in to the system 560 where multiple clients may be handled, optionally simultaneously.

As an example, a seismic workflow may provide for processing of microseismic data as a type of seismic data. Microseismic monitoring (e.g., a type of seismic survey) provides a valuable tool to evaluate hydraulic fracture treatments in real-time and can be utilized in planning and managing reservoir development. Microseismic event locations, source characteristics and attributes provide can provide estimates of hydraulic fracturing geometry that can be evaluated with respect to a completion plan and expected fracture growth. Microseismic event derived attributes such as fracture azimuth, height and length, location and complexity, may be utilized to determine the extent of fracture coverage of the reservoir target and effective stimulated volume, as well as in diagnosing under-stimulated sections of the reservoir and in planning re-stimulation of under-producing perforations and wells. Microseismic event locations can also help to avoid hazards during stimulation (e.g. faults, karst, aquifers, etc.). As an example, a method can include modifications to one or more treatment plans and operations based at least in part on microseismic interpretations as part of a seismic interpretation workflow.

Integrated workflows leveraging multi-scale, multi-domain measurements and microseismic interpretation can allow for optimization of hydraulic fracturing treatment for increased production. Such integrated completions planning workflows may use a wide variety of information about the geology (e.g., lithology, stress contrast, natural fracturing, structural or depositional dip, faulting), and the associated rock properties, (e.g., noise, slowness, anisotropy, attenuation) to improve hydraulic fracturing operations to lead to improved hydraulic fracture stimulations, completion plans, and well placement and, thereby, improved production. As an example, microseismic event locations and attributes may be integrated and compared with treatment pressure records, proppant concentration, and injection rate to better perform field operations.

FIGS. 1, 2, 3, 4 and 5 show various examples of equipment in various examples of environments. As an example, one or more workflows may be implemented to perform operations using equipment in one or more environments. As an example, a workflow may aim to understand an environment. As an example, a workflow may aim to drill into an environment, for example, to form a bore defined by surrounding earth (e.g., rock, fluids, etc.). As an example, a workflow may aim to acquire data from a downhole tool disposed in a bore where such data may be acquired via a drilling tool (e.g., as part of a bottom hole assembly) and/or a wireline tool. As an example, a workflow may aim to support a bore, for example, via casing. As an example, a workflow may aim to fracture an environment, for example, via injection of fluid. As an example, a workflow may aim to produce fluids from an environment via a bore. As an example, a workflow may utilize one or more frameworks that operate at least in part via a computer (e.g., a computing device, a computing system, etc.).

Figure 6:
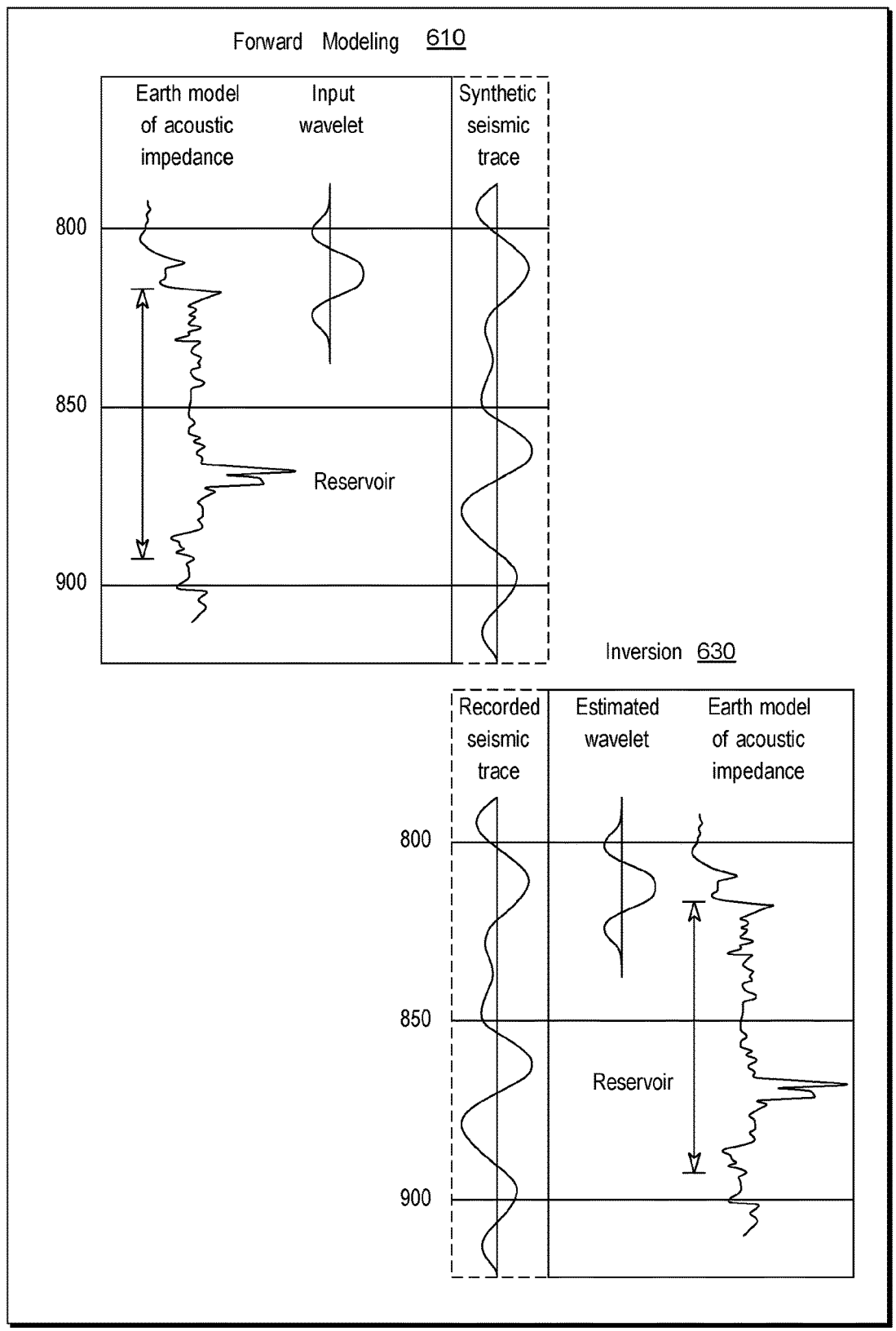
FIG. 6 illustrates an example of forward modeling and inversion as to seismic data and an Earth model of acoustic impedance.

FIG. 6 shows an example of forward modeling 610 and an example of inversion 630 (e.g., an inversion or inverting). As shown, the forward modeling 610 progresses from an earth model of acoustic impedance and an input wavelet to a synthetic seismic trace while the inversion 630 progresses from a recorded seismic trace to an estimated wavelet and an earth model of acoustic impedance. As an example, forward modeling can take a model of formation properties (e.g., acoustic impedance as may be available from well logs) and combine such information with a seismic wavelength (e.g., a pulse) to output one or more synthetic seismic traces while inversion can commence with a recorded seismic trace, account for effect(s) of an estimated wavelet (e.g., a pulse) to generate values of acoustic impedance for a series of points in time (e.g., depth).

As an example, a method may employ amplitude inversion. For example, an amplitude inversion method may receive arrival times and amplitude of reflected seismic waves at a plurality of reflection points to solve for relative impedances of a formation bounded by the imaged reflectors. Such an approach may be a form of seismic inversion for reservoir characterization, which may assist in generation of models of rock properties.

As an example, an inversion process can commence with forward modeling, for example, to provide a model of layers with estimated formation depths, thicknesses, densities and velocities, which may, for example, be based at least in part on information such as well log information. A model may account for compressional wave velocities and density, which may be used to invert for P-wave, or acoustic, impedance. As an example, a model can account for shear velocities and, for example, solve for S-wave, or elastic, impedance. As an example, a model may be combined with a seismic wavelet (e.g., a pulse) to generate a synthetic seismic trace.

Inversion can aim to generate a "best-fit" model by, for example, iterating between forward modeling and inversion while seeking to minimize differences between a synthetic trace or traces and actual seismic data.

As an example, a framework such as the ISIS inversion framework (Schlumberger Limited, Houston Tex.) may be implemented to perform an inversion. As an example, a framework such as the Linearized Orthotropic Inversion framework (Schlumberger Limited, Houston, Tex.) may be implemented to perform an inversion.

As mentioned above, as to seismic data, forward modeling can include receiving an earth model of acoustic impedance and an input wavelet to a synthetic seismic trace while inverting can include progressing from a recorded seismic trace to an estimated wavelet and an earth model of acoustic impedance.

As an example, another approach to forward modeling and inversion can be for measurements acquired at least in part via a downhole tool where such measurements can include one or more of different types of measurements, which may be referred to as multi-physics measurements. As an example, multi-physics measurements may include logging while drilling (LWD) measurements and/or wireline measurements. As an example, a method can include joint petrophysical inversion (e.g., inverting) for interpretation of multi-physics logging-while-drilling (LWD) measurements and/or wireline (WL) measurements.

As an example, a method can include estimating static and/or dynamic formation properties from a variety of logging while drilling (LWD) measurements (e.g., including pressure, resistivity, sonic, and nuclear data) and/or wireline (WL) measurements, which can provide for, at least, formation parameters that characterize a formation. As an example, where a method executes during drilling, LWD measurements may be utilized in a joint inversion to output formation parameters (e.g., formation parameter values) that may be utilized to guide the drilling (e.g., to avoid sticking, to diminish one or more types of formation damage, etc.).

In petroleum exploration and development, formation evaluation is performed for interpreting data acquired from a drilled borehole to provide information about the geological formations and/or in-situ fluid(s) that can be used for assessing the producibility of reservoir rocks penetrated by the borehole.

As an example, data used for formation evaluation can include one or more of core data, mud log data, wireline log data (e.g., wireline data) and LWD data, the latter of which may be a source for certain type or types of formation evaluation (e.g., particularly when wireline acquisition is operationally difficult and/or economically unviable).

As to types of measurements, these can include, for example, one or more of resistivity, gamma ray, density, neutron porosity, spectroscopy, sigma, magnetic resonance, elastic waves, pressure, and sample data (e.g., as may be acquired while drilling to enable timely quantitative formation evaluation).

Table 1, below, shows some examples of data, which may be referred to as "log" data that are associated with petrophysical and rock physics properties calculation and analysis.

TABLE 1

Examples of Log Data

| Name | Uses |
|---|---|
| Gamma Ray (GR) | Lithology interpretation, shale volume calculation, calculate clay volume, permeability calculation, porosity calculation, wave velocity calculation, etc. |
| Spontaneous Potential (SP) | Lithology interpretation, Rw and Rwe calculation, detect permeable zone, etc. |
| Caliper (CALI) | Detect permeable zone, locate a bad hole |
| Shallow Resistivity (LLS and ILD) | Lithology interpretation, finding hydrocarbon bearing zone, calculate water saturation, etc. |
| Deep Resistivity (LLD and ILD) | Lithology interpretation, finding hydrocarbon bearing zone, calculate water saturation, etc. |
| Density (RHOB) | Lithology interpretation, finding hydrocarbon bearing zone, porosity calculation, rock physics properties (Al, SI, $\sigma$, etc.) calculation, etc. |
| Neutron Porosity (BPHI or TNPH or NPHI) | Finding hydrocarbon bearing zone, porosity calculation, etc. |
| Sonic (DT) | Porosity calculation, wave velocity calculation, rock physics properties (Al, SI, $\sigma$, etc.) calculation, etc. |
| Photoelectric (PEF) | Mineral determination (for lithology interpretation) |

Information from one or more interpretations can be utilized in one or more manners with a system that may be a well construction ecosystem. For example, seismic data may be acquired and interpreted and utilized for generating one or more models (e.g., earth models) for purposes of construction and/or operation of one or more wells.

Figure 7:
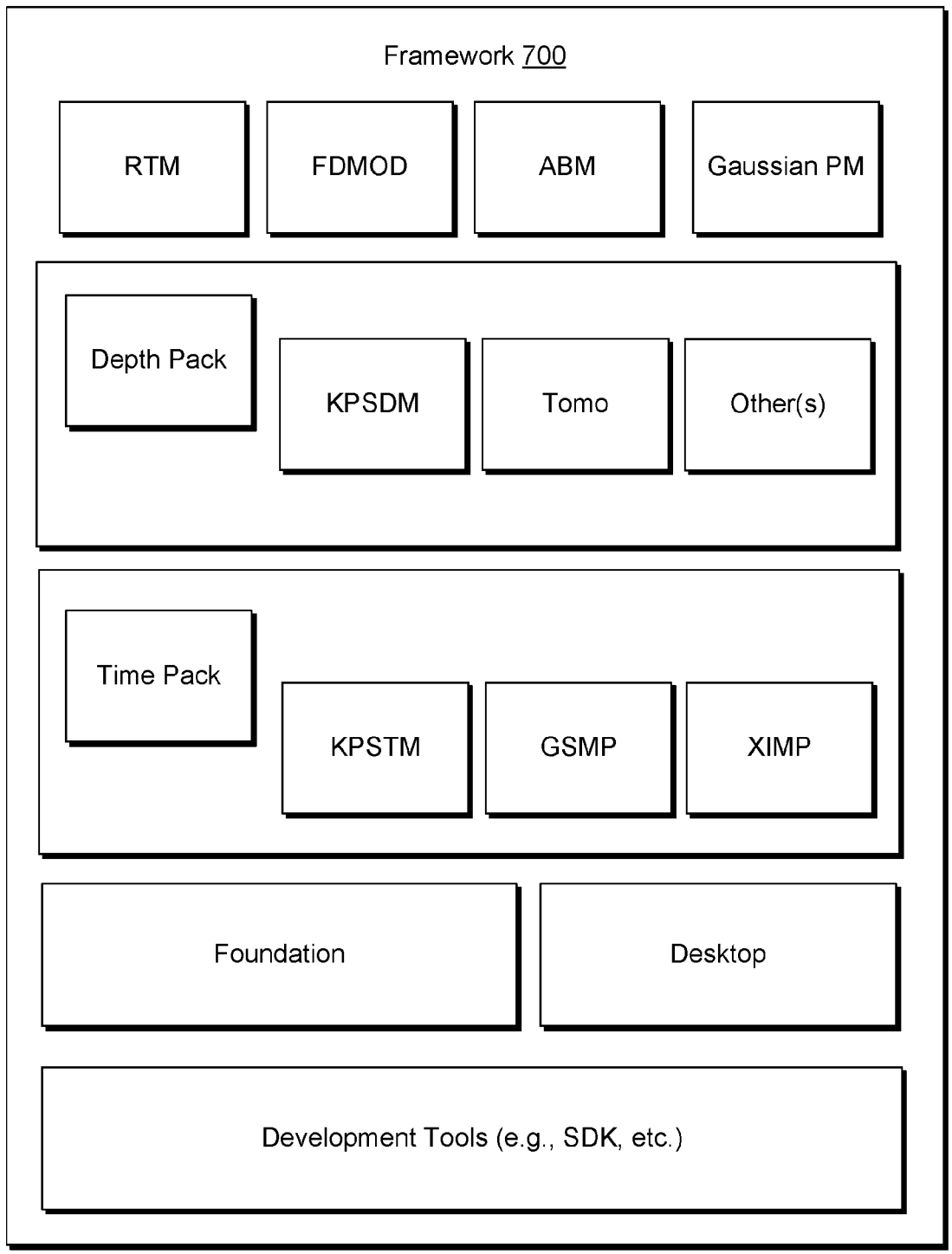
FIG. 7 illustrates an example of a computational framework.

FIG. 7 shows an example of a computational framework 700 that can include one or more processors and memory, as well as, for example, one or more interfaces. The computational framework of FIG. 7 can include one or more features of the OMEGA® framework (Schlumberger Limited, Houston, Tex.), which includes finite difference modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density.

As shown in FIG. 7, the computational framework 700 includes features for RTM, FDMOD, adaptive beam migration (ABM), Gaussian packet migration (Gaussian PM), depth processing (e.g., Kirchhoff prestack depth migration (KPSDM), tomography (Tomo)), time processing (e.g., Kirchhoff prestack time migration (KPSTM), general surface multiple prediction (GSMP), extended interbed multiple prediction (XIMP)), framework foundation features, desktop features (e.g., GUIs, etc.), and development tools.

The framework 700 can include features for geophysics data processing. The framework 700 can allow for processing various types of data such as, for example, one or more of: land, marine, and transition zone data; time and depth data; 2D, 3D, and 4D surveys; isotropic and anisotropic (TTI and VTI) velocity fields; and multicomponent data.

The framework 700 can allow for transforming seismic, electromagnetic, microseismic, and/or vertical seismic profile (VSP) data into actionable information, for example, to perform one or more actions in the field for purposes of resource production, etc. The framework 700 can extend workflows into reservoir characterization and earth modelling. For example, the framework 700 can extend geophysics data processing into reservoir modelling by integrating with the PETREL® framework via the Earth Model Building (EMB) tools, which enable a variety of depth imaging workflows, including model building, editing and updating, depth-tomography QC, residual moveout analysis, and volumetric common-image-point (CIP) pick QC. Such functionalities, in conjunction with the framework's depth tomography and migration algorithms, can produce accurate and precise images of the subsurface. The framework 700 may provide support for field to final imaging, to prestack seismic interpretation and quantitative interpretation, from exploration to development.

As an example, the FDMOD component can be instantiated via one or more CPUs and/or one or more GPUs for one or more purposes. For example, consider utilizing the FDMOD for generating synthetic shot gathers by using full 3D, two-way wavefield extrapolation modelling, the same wavefield extrapolation logic matches that are used by reverse-time migration (RTM). FDMOD can model various aspects and effects of wave propagation. The output from FDMOD can be or include synthetic shot gathers including direct arrivals, primaries, surface multiples, and interbed multiples. The model can be specified on a dense 3D grid as velocity and optionally as anisotropy, dip, and variable density. As an example, survey designs can be modelled to ensure quality of a seismic survey, which may account for structural complexity of the model. Such an approach can enable evaluation of how well a target zone will be illuminated. Such an approach may be part of a quality control process (e.g., task) as part of a seismic workflow. As an example, a FDMOD approach may be specified as to size, which may be model size (e.g., a grid cell model size). Such a parameter can be utilized in determining resources to be allocated to perform a FDMOD related processing task. For example, a relationship between model size and CPUs, GPUs, etc., may be established for purposes of generating results in a desired amount of time, which may be part of a plan (e.g., a schedule) for a seismic interpretation workflow.

As an example, as survey data become available, interpretation tasks may be performed for building, adjusting, etc., one or more models of a geologic environment. For example, consider a vessel that transmits a portion of acquired data while at sea and that transmits a portion of acquired data while in port, which may include physically offloading one or more storage devices and transporting such one or more storage devices to an onshore site that includes equipment operatively coupled to one or more networks (e.g., cable, etc.). As data are available, options exist for tasks to be performed.

Various embodiments of the present disclosure may provide systems, methods, and computer-readable storage media for the interpretation and integration of analogues into reservoir characterization workflows. In certain embodiments, this approach may reduce the time spent on interpretation and integration of analogues into reservoir characterization studies while increasing quality and productivity, while reducing cost. A reservoir characterization can be more accurate when utilizing one or more analogue based sets of data.

In the petroleum industry, remote sensing combined with 3D modelling of exposed reservoir analogues can improve the understanding of subsurface reservoirs. The exposed portions can act as a quantitative and qualitative source of information to bridge a gap between seismic- and well- scales, including inter-well facies distribution and structural architectures (see, e.g., FIG. 13).

3D digital models of analogues can be built using geospatial technologies such as laser scanning (LIDAR) and digital photogrammetry (SFM), either ground-based or mounted on unmanned aerial vehicles (UAVs). A resulting dataset can be combined with one or more other types of data such as, for example, remote sensing data, hyperspectral imaging data, etc., to complement models with property mapping.

As an example, a workflow can include processing information made available by via one or more exposed sections of the Earth (e.g., as analogue models or exposed analogues). Such a workflow can include utilizing such information in a manner that complements other types of information (e.g., seismic data, well logs, etc.), which may add confidence and reduce uncertainty as to one or more models of a subterranean region.

As an example, a workflow may involve: automated and quantitative analysis of exposed analogues; automated geostatistical analysis of the reservoir properties; sedimentary forward modelling; synthetic seismic generation and matching to subsurface seismic data; and training data generation for interpretation constrained by geological rules derived from analogues. In such a workflow, a resulting reservoir model can then be used for one or more purposes, such as fluid flow simulation (e.g., via a reservoir simulator, etc.).

The integration of multi-type datasets can improve the knowledge transfer from ground to sub-surface, increasing efficiency and consistency in modeling complex reservoirs, which can help to reduce various types of exploration risks and, for example, improve reservoir management operations (e.g., drilling, injecting, producing, etc.).

Figure 8:
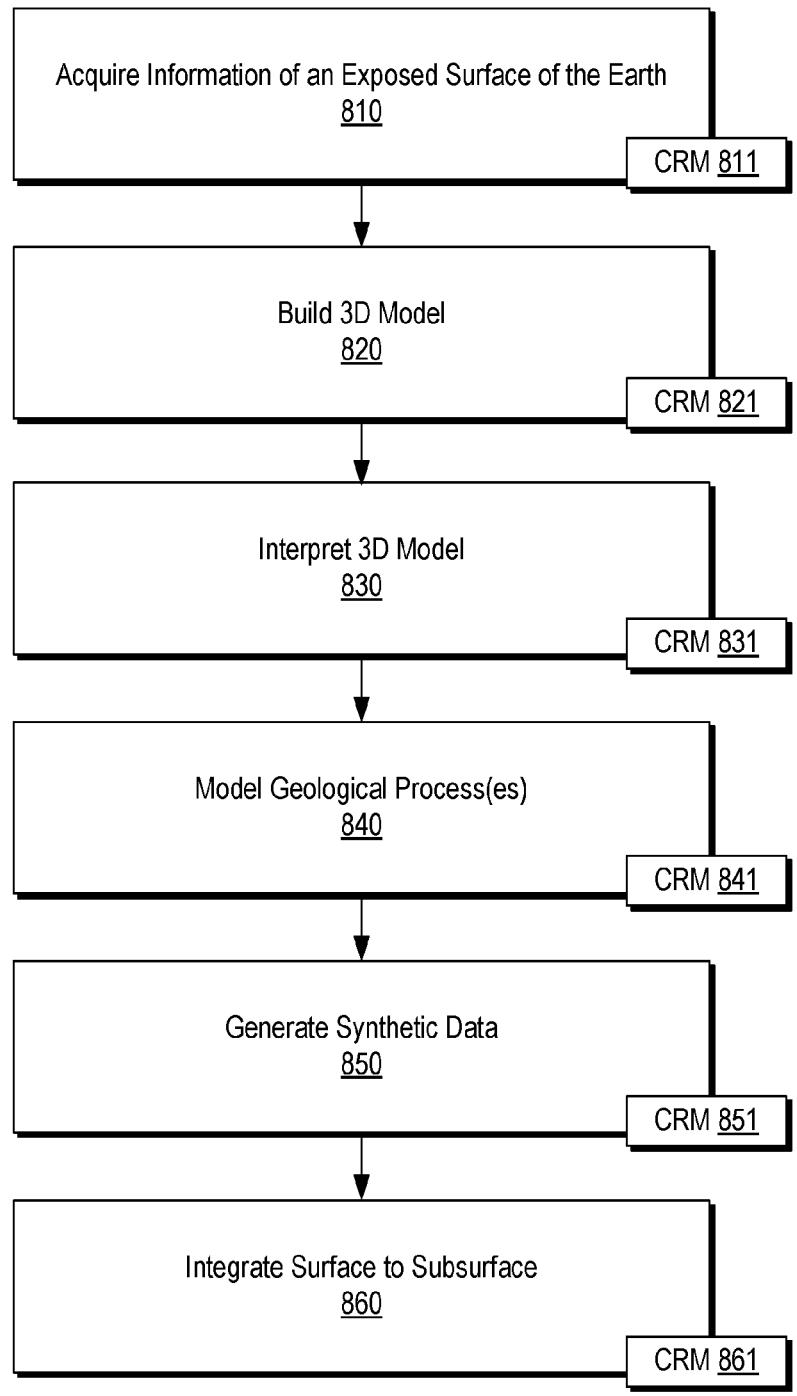
FIG. 8 illustrates an example of a method.

FIG. 8 shows an example of a method 800 that includes an acquisition block 810 for acquiring information of an exposed surface of the Earth via one or more imaging techniques; a build block 820 for building a 3D model based at least in part on the information; an interpretation block 830 for interpreting the 3D model; a model block 840 for modeling one or more geological processes based at least in part on the interpreted 3D model; a generating block 850 for generating synthetic data based at least in part on the modeling of the one or more geological processes; and an integration block 860 for integrating the information to a subsurface region of the Earth as part of an interpretation process for the subsurface region of the Earth.

FIG. 8 also shows various computer-readable medium (CRM) blocks 811, 821, 831, 841, 851, and 861 as associated with the blocks 810, 820, 830, 840, 850, and 860. Such blocks can include instructions that are executable by one or more processors, which can be one or more processors of a computational framework, a system, a computer, etc. A computer-readable medium can be a computer-readable storage medium that is not a signal, not a carrier wave and that is non-transitory. For example, a computer-readable medium can be a physical memory component that can store information in a digital format. Where a CRM is part of a computing system or otherwise operatively coupled to a computing system, the system is a specialized system that can perform the method 800 of FIG. 8. Such a system can improve accuracy of an interpretation process for a subsurface region of the Earth. Such a process can include rendering one or more images to a display, rendering one or more graphics to a display, etc. In such examples, an image can be of a surface region, a subsurface region or a combination of a surface region and a subsurface region (e.g., as in an overlay of an analogue and a subsurface region). In such examples, a graphic may be a vector graphic rendering, which may be of a model that is defined by spatial positions that correspond to spatial positions of a subsurface region of the Earth, which may be in one or more coordinate systems and/or reference systems (e.g., actual, prior time, future time, etc.).

Figure 9:
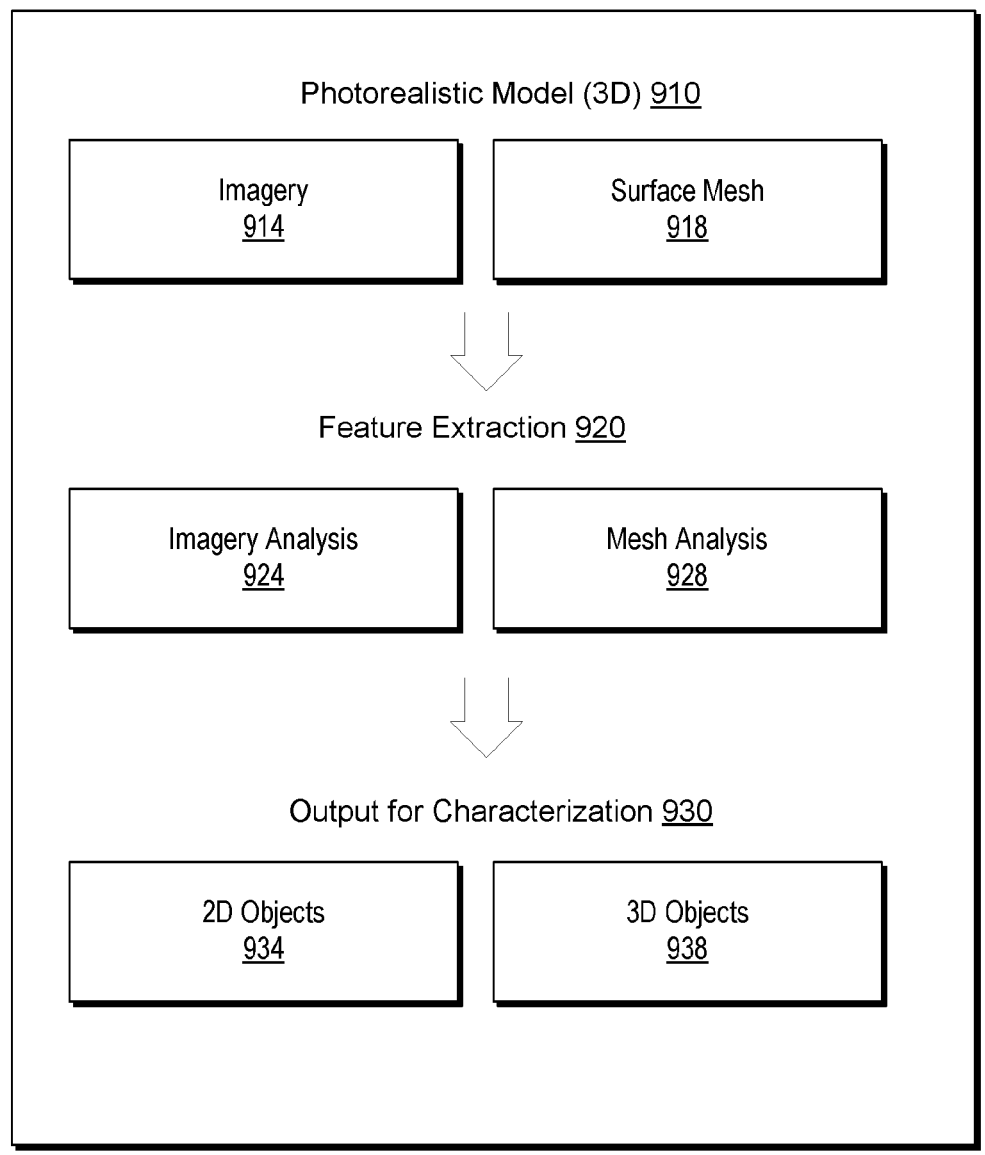
FIG. 9 illustrates an example of a framework.

FIG. 9 shows an example of a framework 900 that can output information such as object information based on imagery. As shown the framework 900 includes a photorealistic model (3D) layer 910 with an imagery component 914 and a surface mesh component 918, a feature extraction layer 920 with an imagery analysis component 924 and a mesh analysis component 928, and an output layer 930 with a 2D objects component 934 and a 3D objects component 938.

In the example of FIG. 9, the imagery can be one or more of LIDAR, satellite, photography, drone, etc., imagery, which can be in the form of digital data. As an example, a mesh may be a polygonal mesh. For example, consider a surface mesh that utilizes triangles as polygons as may be defined by nodes where each triangle can be a surface element (e.g., a surfel). As an example, a surface mesh may be defined in a 3D space and, for example, utilized to generate a 3D model (e.g., a grid cell model).

As to image analysis, a component can include features for filtering and/or other image analysis. As an example, a component can include tracking features such as "ant tracking", which may aim to group contiguous portions of an image (e.g., based on color, intensity, texture, etc.). As an example, a mesh analysis component can include features for attribute calculations and, for example, clustering. As to output, a determination may be made as to confidence where confidence is linked to dimensionality. For example, a low confidence may output a 2D object whereas a higher confidence may output a 3D object.

As an example, the framework 900 may be implemented for purposes of automated feature extraction. For example, consider an automated fracture extraction work ow implemented by the framework 900. In such an example, automated fracture picking can be based on image analysis (color photographs) and mesh analysis (triangulated surface) where objects picked by both methods have been subdivided into two-dimensional (2D) and three-dimensional (3D) objects based on con dence to t a plane through each extracted object. Objects may be used for various statistics and may be used for orientation.

As an example, an exposed area of the Earth may be scanned with terrestrial LIDAR and photographed with a high-resolution digital camera. In such an example, point cloud and high-resolution digital images may be acquired from multiple positions (two and three positions, respectively) located at a distance from the exposed area. As an example, consider a point cloud with millions of points, which may be decimated to construct one or more triangulated meshes. In such an example, a mesh or meshes may be utilized for purposes of draping high-resolution digital photographic images upon them. In such an approach, a photorealistic 3D virtual exposed region of the Earth can be generated (e.g., a 3D virtual outcrop, etc.). Such a virtual region may be referred to as a 3D model that is based on imagery.

LIDAR is a surveying technique that includes measuring distance to a target by illuminating the target with pulsed laser light and measuring the reflected pulses with a sensor. In LIDAR, differences in laser return times and wavelengths can then be used to make digital 3-D representations of the target. The name LIDAR, now used as an acronym of light detection and ranging (or sometimes light imaging, detection, and ranging), was originally a portmanteau of light and radar. LIDAR is sometimes called laser scanning and 3-D scanning, with terrestrial, airborne, and mobile applications.

As an example, a 3D model that is based on imagery may be subject to interpretation, for example, to identify stratigraphic surfaces, diagenetic domains, feature picking, etc. As to feature picking, a feature may be a channel, a fracture, a geobody, etc. As an example, a stratigraphic surface may be picked such as a horizon, etc.

As to diagenetic domains, this refers to diagenesis, which is the physical, chemical or biological alteration of sediments into sedimentary rock at relatively low temperatures and pressures that can result in changes to a rock's original mineralogy and texture. After deposition, sediments are compacted as they are buried beneath successive layers of sediment and cemented by minerals that precipitate from solution. Grains of sediment, rock fragments and fossils can be replaced by other minerals during diagenesis. Porosity may decrease during diagenesis, except in rare cases such as dissolution of minerals and dolomitization. Diagenesis does not include weathering processes. Hydrocarbon generation can commence during diagenesis. Metamorphism can occur at pressures and temperatures higher than those of the outer crust, where diagenesis occurs.

Interpretation results of a 3D model that is based on imagery may be utilized to construct a model that is a geocellular model (e.g., a grid cell model, a nodal model, etc.). For example, consider a geocellular model that includes cells of length and width sizes of a few meters by a few meters with a height of approximately 0.1 meter to a few meters. As an example, a geocellular model can include more than 10,000 cells, more than 100,000 cells, more than 1,000,000 cells, etc. As an example, a geocellular model can be grouped into layers where layers may be grouped into stratigraphic intervals. Such a geocellular model may be defined as including structural domains (e.g., footwall fault M, graben, footwall fault N, etc.) and as including diagenetic domains (e.g., karst, paleocave, background, etc.). An interpretation process can further include picking as to one or more structural features, which may be via one or more techniques (e.g., automated, manual, semi-automated, etc.). Such structural features may be classified as objects, which may be in one or more dimensions (e.g., 1D, 2D, 2.5D or 3D).

As an example, a grid cell model may be of a spatial resolution that may be greater than a spatial resolution of multidimensional seismic data as acquired via a seismic survey of a region of the Earth. In such an example, where the grid cell model is utilized to generate synthetic seismic data, the generated synthetic seismic data may be of a higher spatial resolution than acquired seismic data.

As mentioned, the method 800 can include the modeling block 840 for geological process modeling. Such modeling may be applied to an interpreted 3D model that is based on imagery. For example, given a geocellular model with various features (e.g., structural and/or diagenetic domains, objects, etc.), geological process modeling may modify the geocellular model based on one or more types of geological processes. For example, consider use of diffusion as a geological process that can be defined based on a diffusion coefficient, time, and spatial coordinates.

As an example, a geological process modeling (GPM) framework may be implemented to subject a geocellular model of an outcrop to one or more geological processes. For example, a GPM framework can include a simulator for stratigraphic forward modeling that reconstructs the processes of erosion, transport and deposition of clastic sediments as well as carbonate growth and redistribution. Such models may show the geometry and composition of the stratigraphic sequences attributable to the interaction of sea level change, paleogeography, paleoclimate, tectonics and variation in sediment supply. A GPM framework may provide for deterministic modeling of complex heterogeneous geological settings such as the resulting bedding structure from multiple sediment sources and the dual porosities stemming from multiple diagenetic processes over geological time in carbonates. Geological process modeling can create realistic models with geological elements properly positioned with respect to other elements in a deterministic model. A model may capture details such as shale baffles, etc.

As an example, a GPM framework can be implemented as a simulator for forward modeling of stratigraphic and sedimentary processes, for example, to model siliciclastic and carbonate reservoirs based on the principle of mass and energy conservation. As an example, a GPM framework may provide for backward modeling, where such modeling may include backstripping, etc.

As an example, a GPM framework can allow for creation of stratigraphic models showing expected sediment geometries and for prediction of lithology distributions as well as insights into composition and deposition of sedimentary sequences. As an example, a GPM framework may be implemented for one or more of modeling erosion, transport, and deposition of clastic and carbonate sediments—either independently or concurrently—in different geological settings (e.g., channels, rivers, turbidity flows, and shoreline systems) along with related geological processes such as carbonate growth, sediment compaction, and fluid expulsion.

As an example, a GPM framework can allow a user to explore different physically defensible scenarios of a depositional architecture and generate digital geological models by numerical simulation of one or more physical processes, for example, in combination with one or more empirical rules. Resulting models can represent a reasonably close approximation of reality where boundary conditions are known.

As an example, a GPM framework may be operatively coupled to the PETREL® framework and/or the PETROMOD® framework (e.g., for petroleum systems modeling as to basin-scale studies to support subsequent analysis of petroleum systems by understanding the charge migration and accumulation of potential hydrocarbons, etc.).

As an example, a GPM framework may aim to increase certainty of an imagery based model. As an example, a GPM framework can generate results that can be used as input in gross depositional environment (GDE) maps, a Play and Prospect Assessment workflow (e.g., PETREL® framework, etc.), exploration risk, resource, and value assessment, etc.

As an example, a GPM framework may model one or more of diffusion, source points, and steady- and unsteady-state flow. As an example, a GPM framework may be utilized to conduct detailed modeling of one or more of turbidites, fluvial systems, deltaic systems, marine systems, etc. As an example, a GPM framework may be utilized to build a complex depositional model for complex depositional histories, such as erosion and interbedding with sedimentation from different sources in different time periods. As an example, a GPM framework may be utilized to combine several types of sediments to create different possible lithologies. As an example, a GPM framework may be utilized to generate one or more of rock-type fractions, depositional geometries, and petrophysical properties (e.g., porosity) for different time scales, optionally with results interactively visualized using a sedimentary process player.

As an example, output from a GPM framework may be utilized for generating surfaces and/or 3D models for use in subsequent actions of a workflow. As an example, a GPM framework can include controllable geological model parameters, which may be utilized to build multiple versions of the same model that represent different scenarios for a conceptual model.

As an example, the method 800 can include outputting a GPM model that is based at least in part on a geocellular model that is based on imagery. In such an example, the GPM model can include information sufficient for purposes of generation of synthetic seismic data. For example, a GPM model can include associated material properties such that seismic energy can be modeled as interacting with material with such material properties.

As an example, a framework that includes one or more features of the OMEGA® framework may be utilized for generation of synthetic seismic data (e.g., and/or one or more seismic attributes). As an example, such a framework may be operatively coupled to a framework such as the PETREL® framework and/or one or more features thereof. As an example, generation of synthetic seismic data may involve using one or more illumination study components of a framework, which may be utilized for one or more acquisition geometries and may aim to illuminate a model (e.g., generate synthetic seismic data therefore), with or without accounting for one or more structures and/or overburden that may otherwise at least in part obscure seismic imaging. In such an approach, synthetic seismic data may be "ideal" or may account for seismic imaging realities (e.g., acquisition geometry, salt body illumination effects, overburden effects, lens effects, multiples, ghosts, etc.). Synthetic seismic data may be generated as a 3D dataset where an analogue-based model may be utilized to generate multiple 3D datasets (e.g., which may account for various factors, including type of survey, illumination effects, etc.).

As an example, synthetic seismic data may be generated based on impedance properties assigned to a 3D model that is based on imagery of an exposed portion of the Earth, which may optionally be a GPM processed model. As an example, a method can include utilizing reflectivity and a wavelet to generate synthetic seismic data (e.g., a synthetic seismic trace). As an example, such a method may include introducing noise such that the synthetic seismic data includes noise. As an example, noise may be selected from one or more types of noise.

Figure 10:
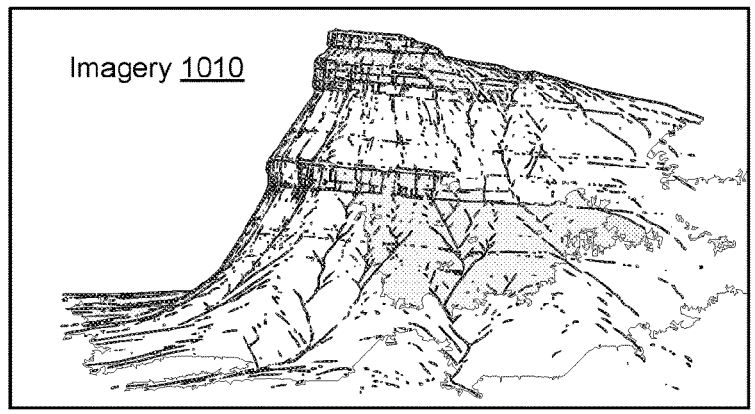
FIG. 10 illustrates an example of imagery, an example of a map and an example of a sequence.
Figure 10:
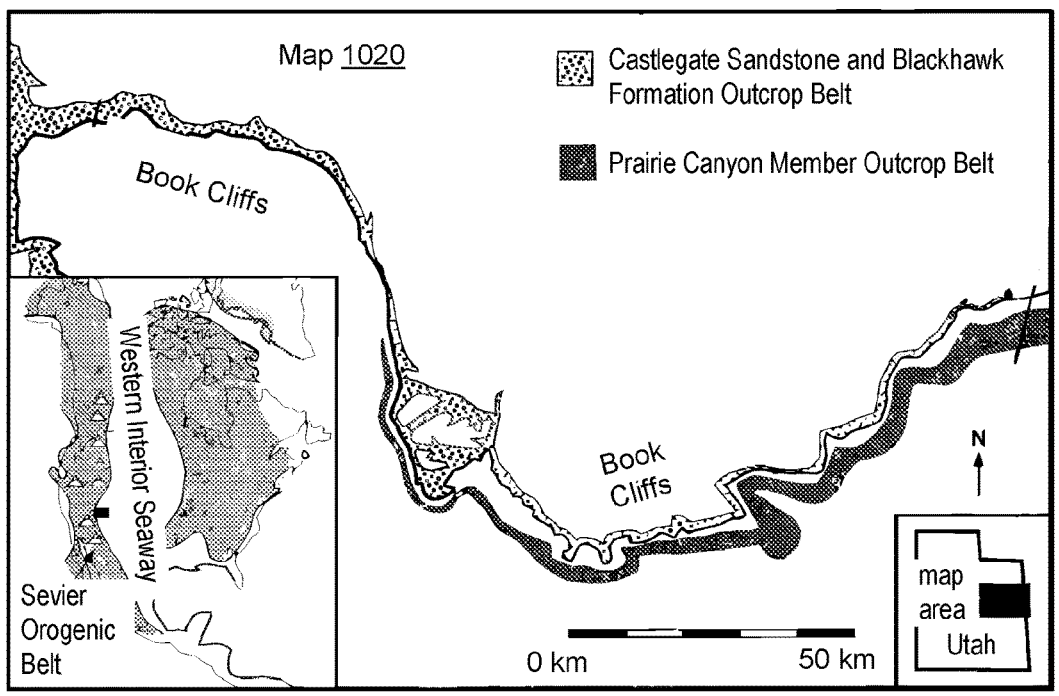
Figure 10:
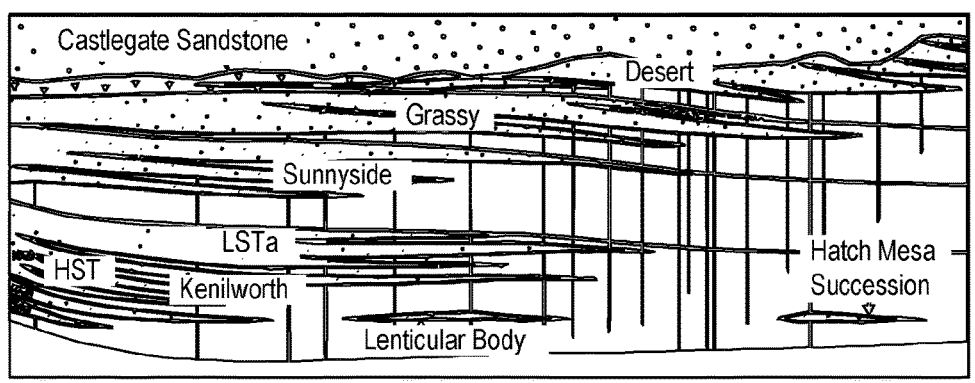

FIG. 10 shows an example of a geologic region where surface imagery 1010 may be available fora portion of the region. For example, consider the Book Cliffs of Utah in the United States, as shown in a map 1020, which includes indications of materials (e.g., sandstone, etc.). The Book Cliffs exhibit preserved strata of the foreland basin of the ancient Western Interior Seaway that stretched north from the Gulf of Mexico to the Yukon in the Cretaceous time. Components of deltaic and shallow marine reservoirs tend to be well preserved in the Book Cliffs. In a sequence diagram 1030, a wave dominated deltaic sequence is indicated with various systems tracts (e.g., HST and LSTa).

A highstand systems tract (HST) involves progradational deposits that form when sediment accumulation rates exceed the rate of increase in accommodation space. HST can constitute the upper systems tract of a stratigraphic sequence, and can lie directly on the maximum flooding surface (mfs) formed when marine sediments reached their most landward position. This systems tract can be capped by a sequence boundary. Stacking patterns can exhibit prograding aggrading clinoforms that thin upward.

A lowstand systems tract (LST) includes deposits that accumulate after the onset of relative a sea-level rise. This systems tract can lie directly on the upper surface of the falling stage systems tract and can be capped by the transgressive surface formed when the sediments onlap onto the shelf margin. Stacking patterns can exhibit backstepping, onlapping, retrogradational, aggrading clinoforms that thicken updip. Lowstand systems tract sediments may fill or partially infill incised valleys that were cut into the highstand systems tract, and other earlier deposits, during a falling stage systems tract (FSST).

While various outcrops exist for the Book Cliffs that can aid in interpretation, uncertainty can exist as to the various formations and accompanying processes involved. Different interpreters may reach different results, which can demonstrate that uncertainty exists as to interpretation of available data. Where data are for subsurface formations, which may not include exposed portions, uncertainty as to interpretations can be heightened. As explained with respect to the method 800 of FIG. 8, GPM may be implemented in a manner that can introduce one or more physical processes that may help to reduce uncertainty. As explained with respect to the method 800 of FIG. 8, one or more analogues may be utilized to understand better a geologic region, for example, to generate a more accurate model of the geologic region, which, in turn, can increase accuracy of interpretations that may be utilized for one or more field operations.

Figure 11:
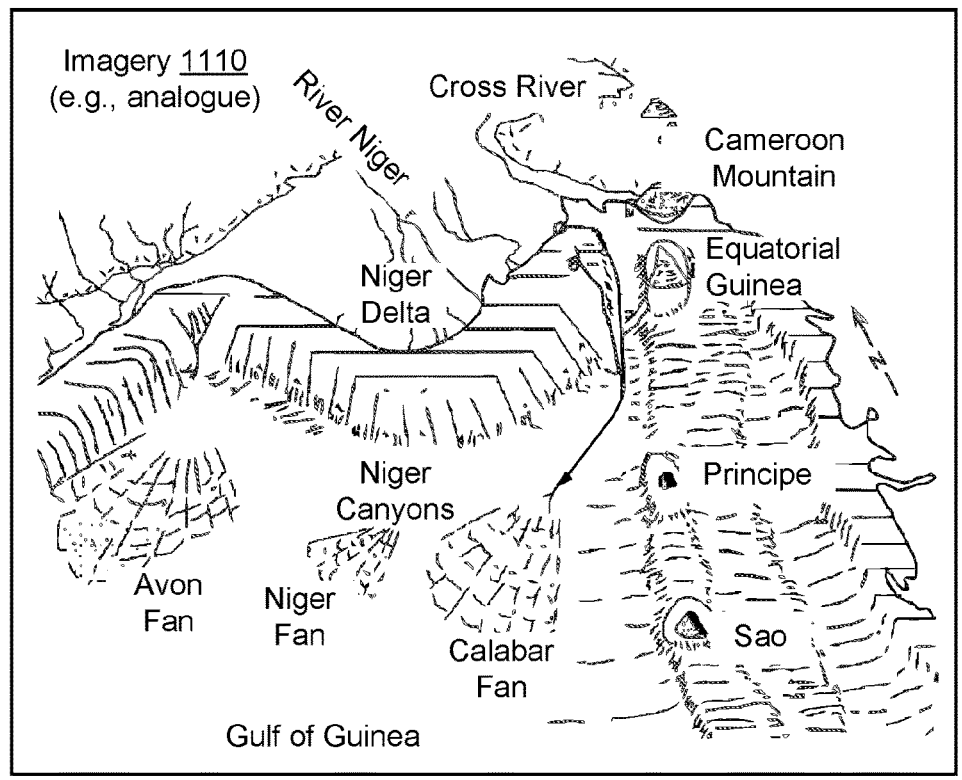
FIG. 11 illustrates an example of imagery and an example of a model generation framework.
Figure 11:
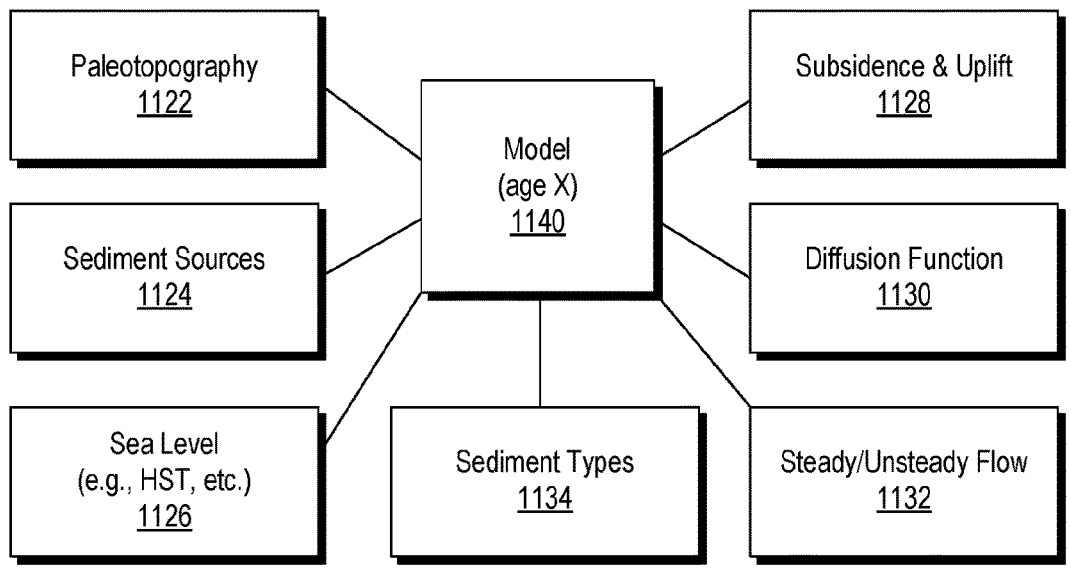

FIG. 11 shows an example of imagery 1110 as may be available at different levels of scale, resolution, perspectives, etc., as to an analogue of a period of time as to another geologic region. For example, the imagery 1110 is shown as the Gulf of Guinea, which includes the Niger Delta. The Niger Delta includes distributary channels that are dominantly affected by tidal currents and has developed 9 to 15 m deep inlets dissecting beach-barrier shoreline. The delta front area of Niger is characterized by a steep narrow beach due to high energy of fair weather wave. A more distal part of the Niger Delta includes subsurface growth faults forming hydrocarbon traps.

The Niger Delta is an exposed region of the Earth that is currently undergoing various geological processes, which may have occurred in one or more other regions of the Earth at prior times.

As an example, one or more regions of the Niger Delta may be selected as one or more corresponding modern analogues to one or more regions associated with the ancient Western Interior Seaway. For example, a region of the Niger Delta may be utilized to understand better processes that existed in prior times that resulted in formations of today as in the Book Cliffs. Such an approach can be utilized to demonstrate use of an analogue; noting that such an approach may be applied to a subsurface region (e.g., a region or regions other than the Book Cliffs) where outcrops may or may not exist. In either instance, utilization of a modern analogue with associated imagery thereof can help to model and reduce model uncertainty of another region of the Earth.

As shown in FIG. 11, a model generation framework 1120 may be implemented using one or more types of information, processes, etc. Such a framework may be or include features of a GPM framework. In the example of FIG. 11, the framework 1120 can include a paleotopography block 1122, a sediment sources block 1124, a sea level block 1126 (e.g., as to systems tracts, etc.), a subsidence and uplift block 1128, a diffusion function block 1130, a steady/unsteady flow block 1132, and a sediment types block 1134. One or more of such features of a framework may be utilized to generate a model per the model block 1140, which may be a model at an age X, which is a model that is a result of one or more physical processes (e.g., a model that has been numerically subjected to one or more physical processes that occur with respect to time).

As an example, a model may be generated using imagery of a surface region of the Earth where the model may be subjected to GPM to adjust the model in time as being subjected to one or more physical processes. As an example, a model may be adjusted spatially. For example, a model may be rotated, stretched, transformed according to a transform, which may be in the form of one or more equations and/or a transform map. As an example, a model may be adjusted via knowledge of one or more types of processes that are believed to have occurred during one or more periods of time of the Earth's history (e.g., global water levels, land mass movements, etc.).

As explained with respect to FIGS. 10 and 11, the Niger Delta can be utilized as a modern analogue to understand better a region such as the Book Cliffs. In such an example, a high stand system track model can be developed based on imagery of the Niger Delta and GPM processing to generate a model of a region of the Book Cliffs as that region exists today, existed at a prior time or may exist at a future time. Such an approach can account for a coastline, a rising sea level, a falling sea level, a river system or river systems supplying sediment into a basin, sediment re-working due to wave action, etc. Such an approach can help to reduce uncertainty in interpretations of data available for the Book Cliffs. As an example, the Niger Delta (or a portion thereof) may serve as an analogue to a subsurface region to help reduce uncertainty in interpretations of data available for the subsurface region.

As an example, a model output via a GPM framework can be a grid cell model, which may be suitable for one or more purposes. As an example, a grid cell model can include cells with properties. As an example, properties can include material properties that can be utilized to determine how seismic energy may respond. For example, a model can be utilized to generate synthetic seismic data. In such an example, one or more seismic input waveforms as associated with one or more sources of seismic energy may be modeled where the waveforms are tracked as they travel through the model. In such an example, one or more receivers may be modeled that receive seismic energy that is reflected by modeled features (e.g., structures, etc.).

As an example, a method can include generating one or more synthetic seismic cubes of seismic data based on a model, where the model is generated at least in part via surface imagery of the Earth (e.g., via imagery of an outcrop, outcrops, etc.).

As an example, a model and/or a region of the Earth may be characterized based at least in part on impedance such as, for example, acoustic impedance, which can be defined as the product of density and seismic velocity, which varies among different rock layers and where the difference in acoustic impedance between rock layers can affect the reflection coefficient (e.g., how seismic energy is reflected, etc.).

Figure 12:
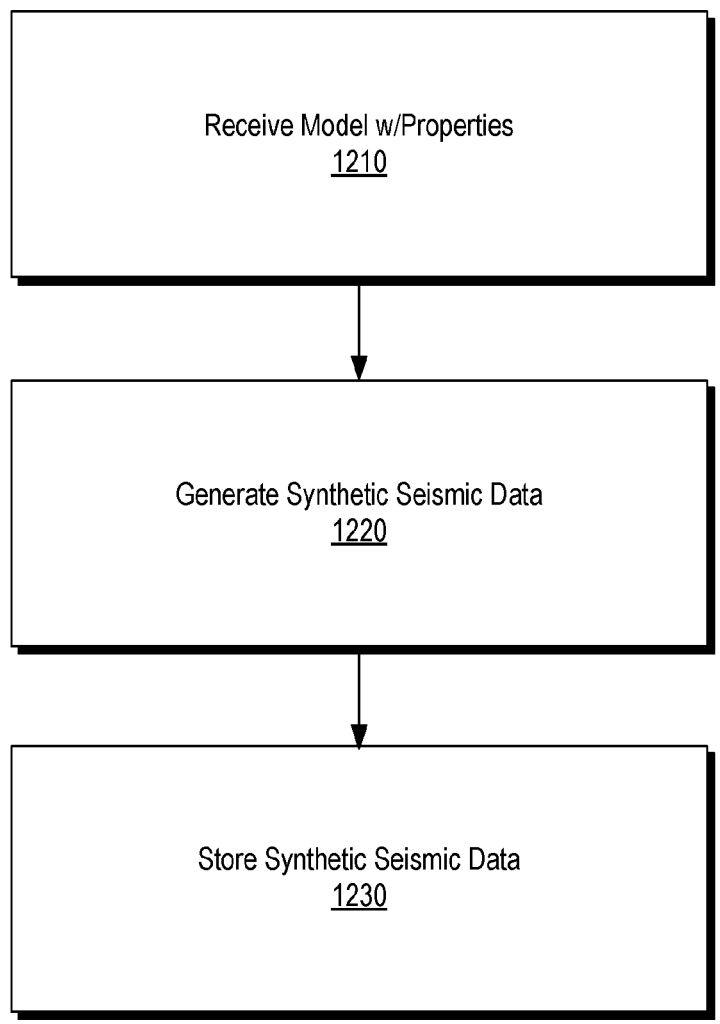
FIG. 12 illustrates an example of a method.

FIG. 12 shows an example of a method 1200 that includes a reception block 1210 for receiving a model with material properties, a generation block 1220 for generating synthetic seismic data and a storage block 1230 for storing at least a portion of the generated synthetic seismic data. Such a method may include one or more processes as may be associated with the forward modeling 610 of FIG. 6 (see, e.g., Earth model of acoustic impedance, input wavelet and synthetic seismic trace).

In the example of FIG. 12, the generated synthetic seismic data can be stored in association with one or more types of information. For example, consider location information as to location of an analogue, imagery information, GPM information, etc.

As an example, the method 1200 may include coding of the generated synthetic seismic data. For example, coding may be with respect to layers as may be present in a grid cell model that is based at least in part on imagery (e.g., image data of an exposed portion of the Earth). As an example, the method 1200 may be implemented in combination with a search framework, which may include a search engine, indexing features to generate a search index, etc. In such an example, one or more search algorithms may be applied utilizing one or more queries to return one or more search results. As an example, where coding is utilized, a series of code monikers may represent a sequence that is a physical sequence of layers (e.g., a stratigraphic sequence). In such an example, given the series of code monikers, the search engine may return search results that are for analogues to a stratigraphic sequence represented by the series of code monikers.

As an example, synthetic seismic data may be generated at one or more resolutions. For example, a model may be at a particular grid cell resolution where a maximum resolution of the seismic data may be associated with the grid cell resolution. As an example, a resolution of the seismic data may be less than the grid cell resolution.

As an example, a model, which may be a grid cell model, can have a resolution that depends on resolution of imagery of an exposed portion of the Earth. In such an example, a method may aim to fill in a so-called resolution gap.

Figure 13:
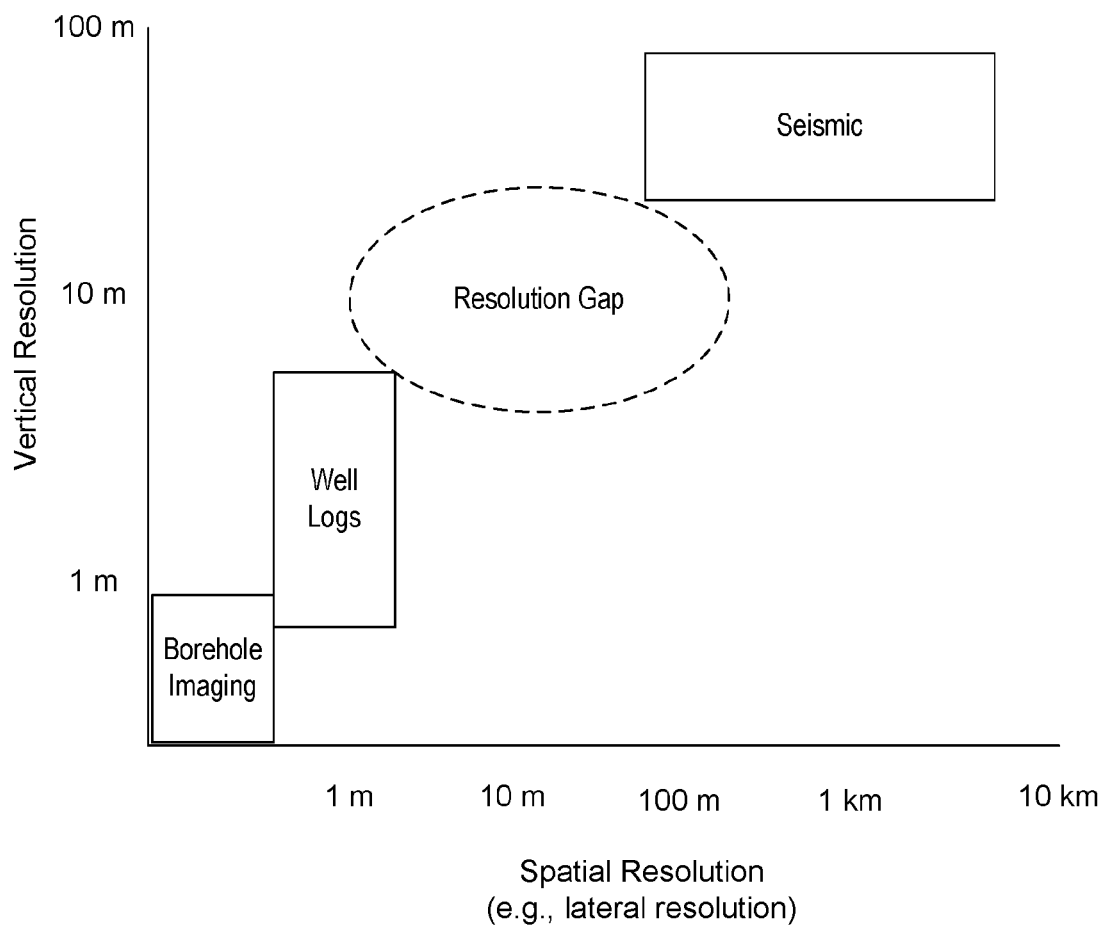
FIG. 13 illustrates an example of a plot.

FIG. 13 shows an example of a plot 1300 that includes some examples of data acquisition technologies that can acquire data for a subsurface formation. In FIG. 13, the example technologies include borehole imaging, well logs and seismic. As shown, a resolution gap can exist in a spatial resolution (e.g., lateral resolution) range of approximately 10 meters to 100 meters and in a vertical resolution range of approximately 8 meters to approximately 20 meters. Through use of analogues, information may be generated that can fill at least a portion of the resolution gap.

As mentioned, surface imagery may be high resolution as may be acquired using high resolution photography, LIDAR, etc. Such high resolution can be higher than that of a seismic survey. Where a grid cell model is based at least in part on high resolution imagery, it too may have a resolution that is greater than that of a seismic survey. Such an approach may generate synthetic seismic data that are of a higher resolution that seismic data acquired from a field survey. In such an approach, a search of a database that includes synthetic seismic data may be performed using real seismic data where such a search can account for differences in resolution of the synthetic and real data.

As an example, consider a search based on a series of code monikers that represent a stratigraphic sequence believed present in acquired seismic data. In such an example, a search engine may generate a best match to that sequence, which may return a search result that includes one or more additional stratigraphic layers. For example, consider a search utilizing a query with five layers and a search result that includes an analogue with six layers. In such an example, one of the six layers may be between one of the five layers of the query. In such an example, the interpretation of the acquired seismic data can be enhanced by the analogue where the sixth layer is provided by the analogue (e.g., as a missing 3' layer between layers 3 and 4, etc.). Such an approach can improve accuracy, for example, based at least in part on the synthetic seismic data of an analogue being of a higher resolution (e.g., a higher vertical resolution) than acquired seismic data.

Where a search of a database returns synthetic seismic data that is of a higher resolution than real seismic data, the synthetic seismic data may fill in spatial gaps (e.g., as to spatial and/or vertical resolution lacking in the real data). Further, as the synthetic seismic data can be associated with an actual formation and/or processing that is known, during an interpretation workflow, a graphical user interface can render associated information to a display during a seismic data interpretation workflow, which may assist a user in determining whether the analogue-based synthetic seismic data add value, in terms of increasing accuracy of the interpretation of the real seismic data.

Figure 14:
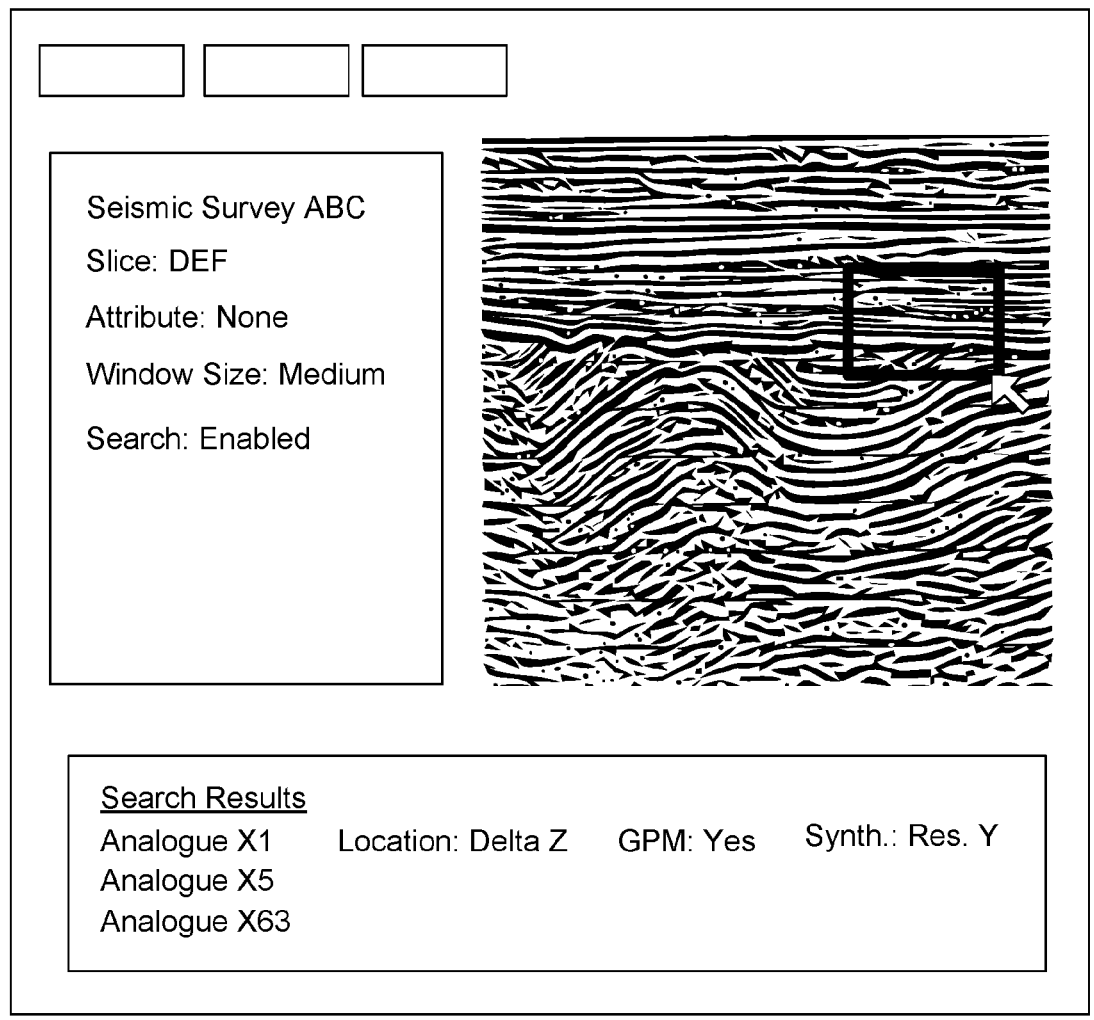
FIG. 14 illustrates an example of a graphical user interface.

FIG. 14 shows an example of a graphical user interface (GUI) 1400 that includes a panel that renders an image based on real seismic data, for example, from a seismic survey of a subsurface region of the Earth. As shown, the GUI 1400 can include a window, which may be adjustable in size and/or other parameters. A user may utilize an input mechanism (e.g., a mouse, a finger, a stylus, etc.) to move the window with respect to the rendered image where information associated with the window (e.g., spatially) can be utilized to perform one or more searches of one or more databases, which can include synthetic seismic data based information. As shown, the GUI 1400 can include a search results panel that can present search results associated with the window. Such results may be listed as to one or more analogues, optionally with information such as location, GPM processing, synthetic seismic data resolution, etc. In the example of FIG. 14, the Analogue X1 search result is associated with a river delta that has been subjected to particular GPM processing where synthetic seismic data is of a resolution Y. Such information may be rendered as available for the other search results. In such an example, a user may readily assess an analogue. As an example, the GUI 1400 can allow for a user to select an analogue and to render one or more types of information associated therewith. For example, consider rendering actual imagery as acquired via photography, LIDAR, etc., and/or rendering one or more models (e.g., triangulated mesh model with imagery draped thereon, GPM model or models, etc.).

As an example, a user may drag the window along the image and determine whether the analogue search results change. For example, as a user moves the window to the left, if the Analogue X1 is presented as the best match, then there may be a higher likelihood that the Analogue X1 is relevant and available to enhance interpretation of the rendered actual seismic data.

As mentioned, a framework may provide for calculation of one or more types of seismic attributes. As shown in the example of FIG. 14, a user may select an attribute field where one or more seismic attributes may be calculated for at least a portion of the real seismic data. In such an example, a search may be performed utilizing a search database that includes synthetic seismic data based attributes. For example, a method may include calculating one or more seismic attributes as a process of synthetic data generation and storing such one or more seismic attributes in a synthetic seismic attribute database. In such an example, a search may be performed using a seismic attribute based on real seismic data to generate search results of synthetic seismic attributes. As an example, a user may utilize a GUI such as the GUI 1400 to perform a seismic data search directly (e.g., based on traces, etc.) and/or to perform a seismic attribute search directly. In such an example, a user may compare search results to determine whether they are consistent between seismic data and seismic attribute(s). In such an example, a user may assess whether an analogue is suitable or not and, for example, what reasons (e.g., attribute quality, raw data quality, etc.).

In various exploration and reservoir seismic surveys, a workflow may aim to adequately image a structure via reflection seismology (e.g., as a form of tomography) and to properly characterize amplitudes of reflections of seismic energy as acquired via one or more sensors that can convert sensed seismic energy to digital data (e.g., seismic data). Assuming that the amplitudes are accurately rendered, a host of additional features can be derived and used in interpretation. Collectively, such features may be referred to as seismic attributes.

An example of a seismic attribute is seismic amplitude, which may be reported as the maximum (positive or negative) amplitude value at each sample along a horizon picked from a 3D volume. In various instances, the amplitude of reflection corresponds directly to porosity or to saturation of the underlying formation that was imaged.

Attributes may be obtained from post-stack seismic data volumes. Additional information may be obtained from attributes of the individual seismic traces prior to stacking, in a prestack analysis. As an example, consider a variation of amplitude with offset (e.g., or amplitude vs. offset (AVO)), which may be used as an indicator of fluid type. Interpretation of an attribute can be made more accurate via utilization of one or more types of other data. As an example, a method can include providing data from a database that includes synthetic data as associated with one or more exposed regions of the Earth, which may be processed, for example, via a GPM framework. Such an approach may help to minimize ambiguities in an interpretation workflow as to physical meaning of seismic data, a seismic attribute(s), etc.

Figure 15:
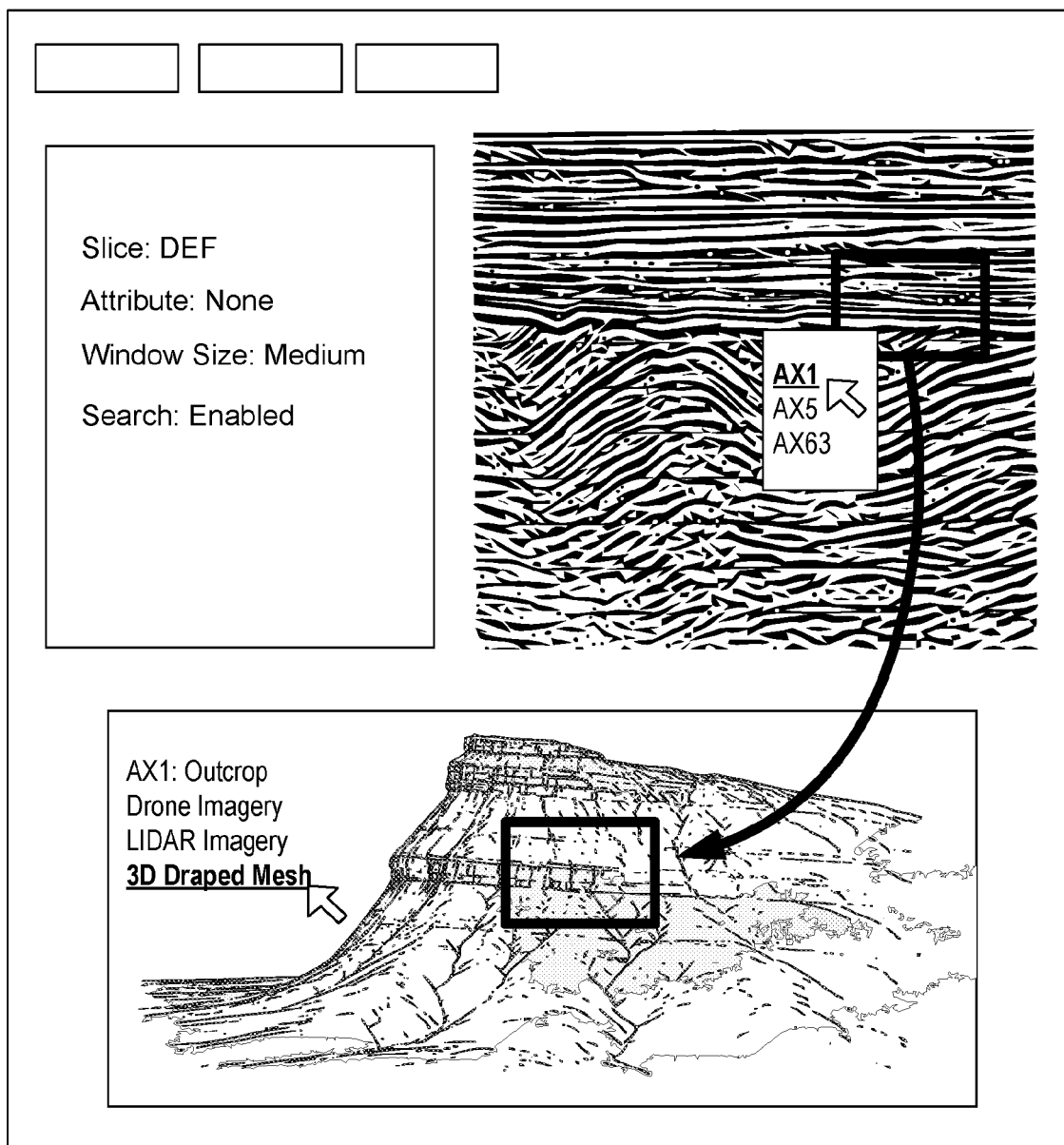
FIG. 15 illustrates an example of a graphical user interface.

FIG. 15 shows an example of a GUI 1500 that includes at least some features of the GUI 1400 of FIG. 14. As shown, a user may select an analogue from a drop down list (e.g., via a right click, a hover, a double click, etc.) such that one or more types of information associated with the selected analogue is rendered to a display. In the example of FIG. 15, a 3D draped mesh is rendered for the analogue AX1, which is an outcrop. As indicated, a user may select drone imagery, LIDAR imagery, or one or more other types of available imagery. In such an example, where drone imagery is available, the imagery may be video imagery that can be organized as a fly-by video or a real-time interactive display. For example, a computing system may receive input via a GUI and, in response, render sequences of images to a display such that a user may visualize a portion of an analogue from one or more perspectives, in one or more manners, etc. In such an example, overlays may be rendered, for example, via a 3D mesh model of the analogue region. Such overlays may identify lithology, ages, horizons, fractures, faults, etc. As an example, a 3D mesh may include draped synthetic seismic data such that a user may visualize seismic data (e.g., or a seismic attribute) in a multidimensional manner. As an example, a computing system may allow for a user to fly into a 3D mesh model of an analogue, to see structural features that have been reconstructed via one or more processes (e.g., GPM, etc.).

Figure 16:
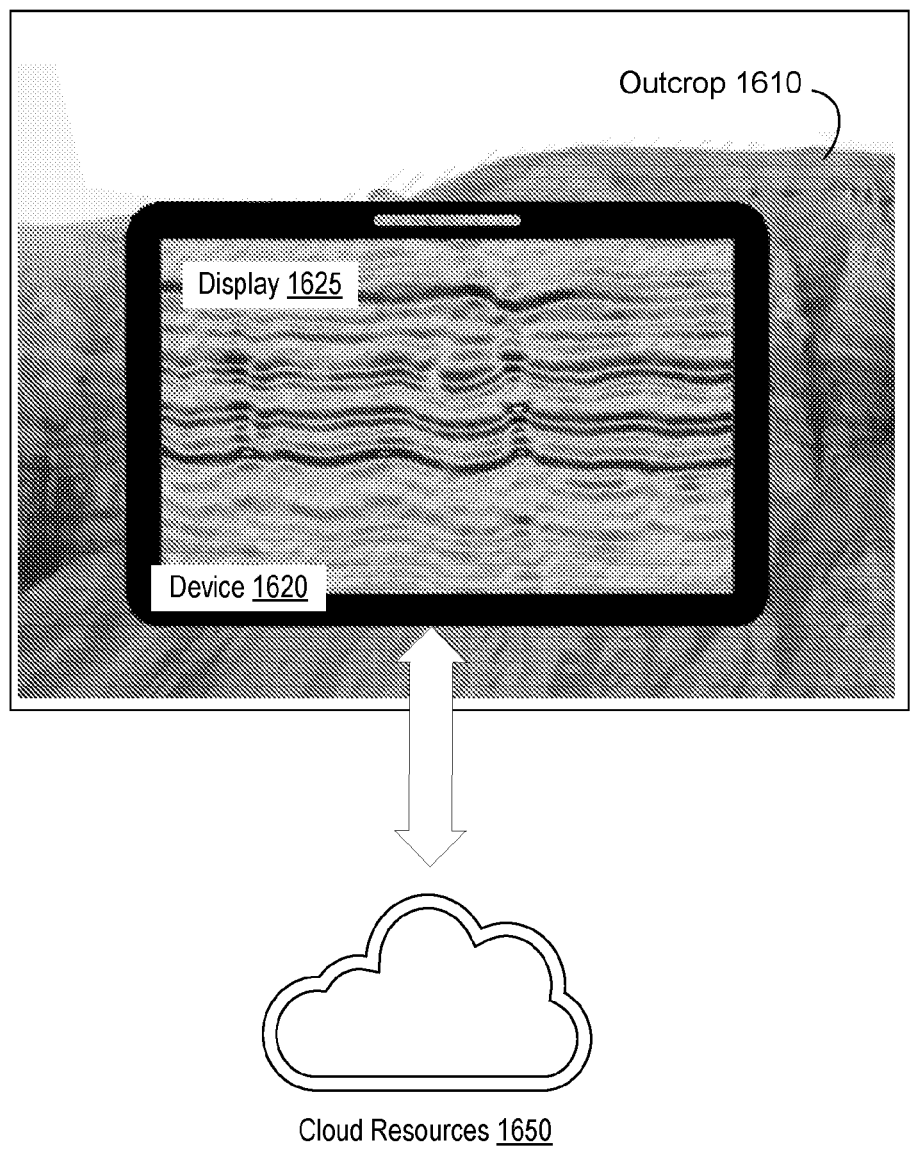
FIG. 16 illustrates an example of a system.

FIG. 16 shows an example of a system 1600 that includes an image of an outcrop 1610, a device 1620 with a display 1625 and cloud resources 1650. In the example of FIG. 16, the device 1620 may be utilized in the field and the outcrop 1610 may be a real outcrop where the device 1620 can image the outcrop 1610. In such an example, the device 1620 can include a network interface that can transmit the imagery (e.g., image data) to the cloud resources 1650 which can utilize one or more frameworks to generate synthetic seismic data, which can be transmitted to the device 1620 for rendering to its display 1625. In such an example, the device 1620 can be a visualization device that can visualize synthetic seismic data that corresponds to features of the outcrop 1610.

As an example, the system 1600 may operate utilizing a database that may at least in part be generated in advance of utilization of the device 1620 in the field. In such an example, the synthetic seismic data as rendered to the display 1625 as an image may be pre-existing and transmitted to the device 1620 via one or more networks. For example, the device 1620 may capture an image of the outcrop 1610 and transmit location/position information to the cloud resources 1650 where the cloud resources 1650 return synthetic seismic data that can be rendered to the display 1625 of the device 1620. In such an example, the device 1620 may include a processor and memory that can execute various applications to analyze a captured image to generate extent information (e.g., boundaries, coordinates, etc.). As an example, such extent information may be transmitted to a remote computing system, optionally as an application programming interface (API) call that responds with synthetic seismic data, which may be image data, for rendering to the display 1625 of the device 1620.

While the device 1620 is shown as being utilized in a field setting, as mentioned, the image in FIG. 16 of the outcrop 1610 may be an image that is rendered to a display that is operatively coupled to a computing system. In such an example, a user may point the device 1620 as an allied device (e.g., an auxiliary device) at the display to cause the device 1620 to receive synthetic seismic data, optionally as image data, that can be rendered to the display 1625 of the device 1620. Such a device may be utilized for purposes of interpreting one or more regions of the Earth.

As an example, where the image of the outcrop 1610 is rendered to a display of a computing system, the computing system may render a GUI that includes a window that is positionable with respect to the image of the outcrop 1610 where synthetic seismic data are rendered within the window where such data correspond to respective portion(s) of the outcrop 1610.

As an example, to facilitate searching, synthetic seismic data (e.g., and/or synthetic seismic attributes) may be coded. As an example, consider a code that can utilize numbers, letters, symbols, etc. As an example, consider a genetic code, which may include constructs such as codons, etc. (e.g., a "DNA" type of code).

Figure 17:
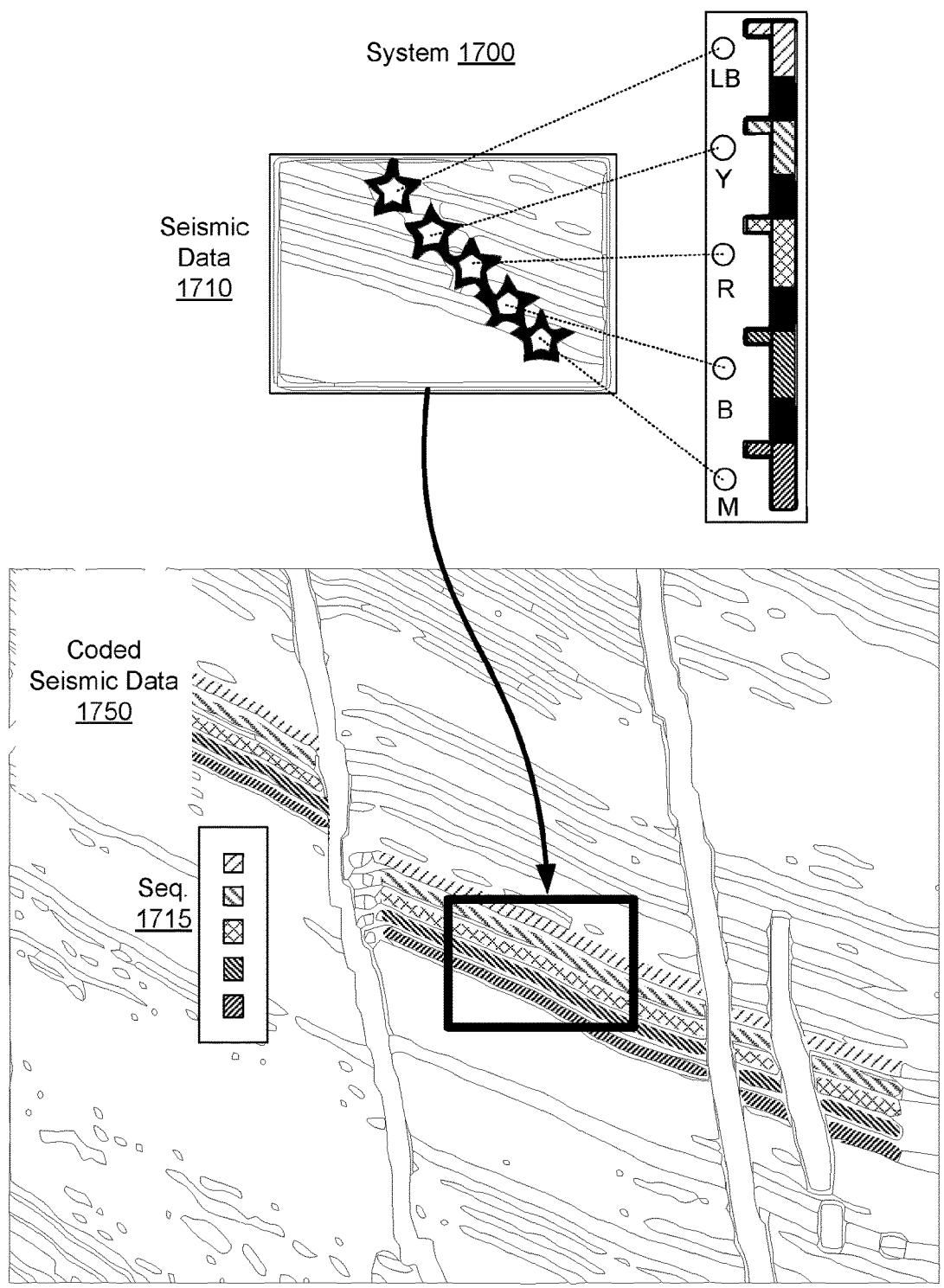
FIG. 17 illustrates an example of a system.

FIG. 17 shows an example of a system 1700 for coding seismic data (e.g., real seismic data and/or synthetic seismic data). As shown, seismic data 1710 may be rendered to a display and represented as a sequence 1715 for which a code 1720 can be applied. In the example of FIG. 17, the code includes colors represented as light blue (LB), yellow (Y), red (R), blue (B) and magenta (M), which may be referred to as code monikers. The code 1720 may be applied to a sequence in the seismic data 1720. Such a code may be utilized for purposes of identifying structural features, which may be separated by one or more other structural features (e.g., fractures, faults, etc.).

As an example, a code may be utilized for purposes of searching a database. In the example of FIG. 17, the sequence includes a code with five members, LB, Y, R, B and M. Such a code may be from an upper to a lower feature (e.g., layers, etc.). Such a code may be utilized to search for another five member occurrence of the sequence 1715 in a database that includes synthetic seismic data and optionally real seismic data, which may be similarly coded. The system 1700 of FIG. 17 may be implemented to expedite interpretation as search results may be accessed (e.g., found via matching, etc.) more rapidly where a code system is utilized. Such an approach can expedite interpretation and can provide one or more analogue based search results that can aid in interpretation of seismic data. As mentioned, a closed match may return one or more results with a greater number of layers, which may be due, for example, to a higher resolution of synthetic data when compared to actual data.

Referring again to the GUI 1400 of FIG. 14, the seismic data rendered to the display may be coded per a code such as the code 1710. In such an example, the positionable window may access codes associated with the seismic data and transmit the codes to a search engine that can utilize the codes to perform a database or database searches that include coded analogue information. In such an example, a sequence may be identified as part of an analogue and returned as a search result.

As mentioned, certain techniques, such as those performed at a well, can provide high resolution data with considerable detail about the subsurface while other techniques, such as seismic, provide information about the subsurface, but tend to do so at much lower resolution. As mentioned, the use of outcrops as analogues for quantitative geometries can help bridge the resolution gap and aid in the understanding of the subsurface.

As an example, a method can include data acquisition through various techniques (e.g., well testing, photography, seismic, etc.) and then digitalization to create a 3D digital model. The approach may include automated interpretation and exporting that automated interpretation into a knowledge database, such as a data lake (e.g., optionally stored utilizing cloud resources, etc.). A geological expert systems-based interpretation system may be used to quantify the results. The approach may involve the automated extraction of the quantitative and qualitative information, and the automated population of a model based on the extracted information. Such an approach may involve the use of training data for artificial intelligence/machine learning applications. As an example, a machine learning approach may provide for classification, coding, etc. For example, a machine learning component of a framework may automatically code information such as synthetic seismic data associated with analogues. As an example, an approach may involve capturing petro-technical expertise of interpreters (expert systems based) and using the information to constrain a subsurface model with geological rules. In certain embodiments, a knowledge database may provide archiving capability and also make data more easily transferable. Such a system may also provide a multi-platform and computational power flexibility of a cloud solution.

As mentioned, a workflow can include utilizing exposed analogues in subsurface characterization. Such an approach may begin with acquisition and 3D model building and visualization. Such an approach may also involve automated outcrop interpretation and geological process modelling. This may be used to generate synthetic seismic data (e.g., and/or attributes), which can then be used to integrate the information learned at the surface into the subsurface. In certain embodiments, automated outcrop interpretation may be performed using machine learning algorithms and techniques. As an example, automated results may be supplemented with additional data created from direct observations.

As an example, a photorealistic 3D outcrop may be prepared which enables the use of automated interpretation tools to characterize the dependency between fractures and bedding. A solution such as Geologic Process Modeler (GPM) may be used to model an outcrop and synthetic seismic data may be created representing the outcrop.

As mentioned, a seismic genetic coding (e.g., "DNA") approach may be used to facilitate surface to sub-surface integration. Such an approach may automatically identify features from visible portions of an outcrop or other analogue and then identify corresponding features in the subsurface. While various examples of coding pertain to seismic coding, coding may be utilized for one or more other aspects, which may aim to expedite searching and/or interpretation. As an example, an embodiment can include rendering user aids as part of a graphical user interface for identifying characteristics of an analogue. A user may, in certain embodiments, validate the manner in which this information is integrated into a subsurface model.

Figure 18:
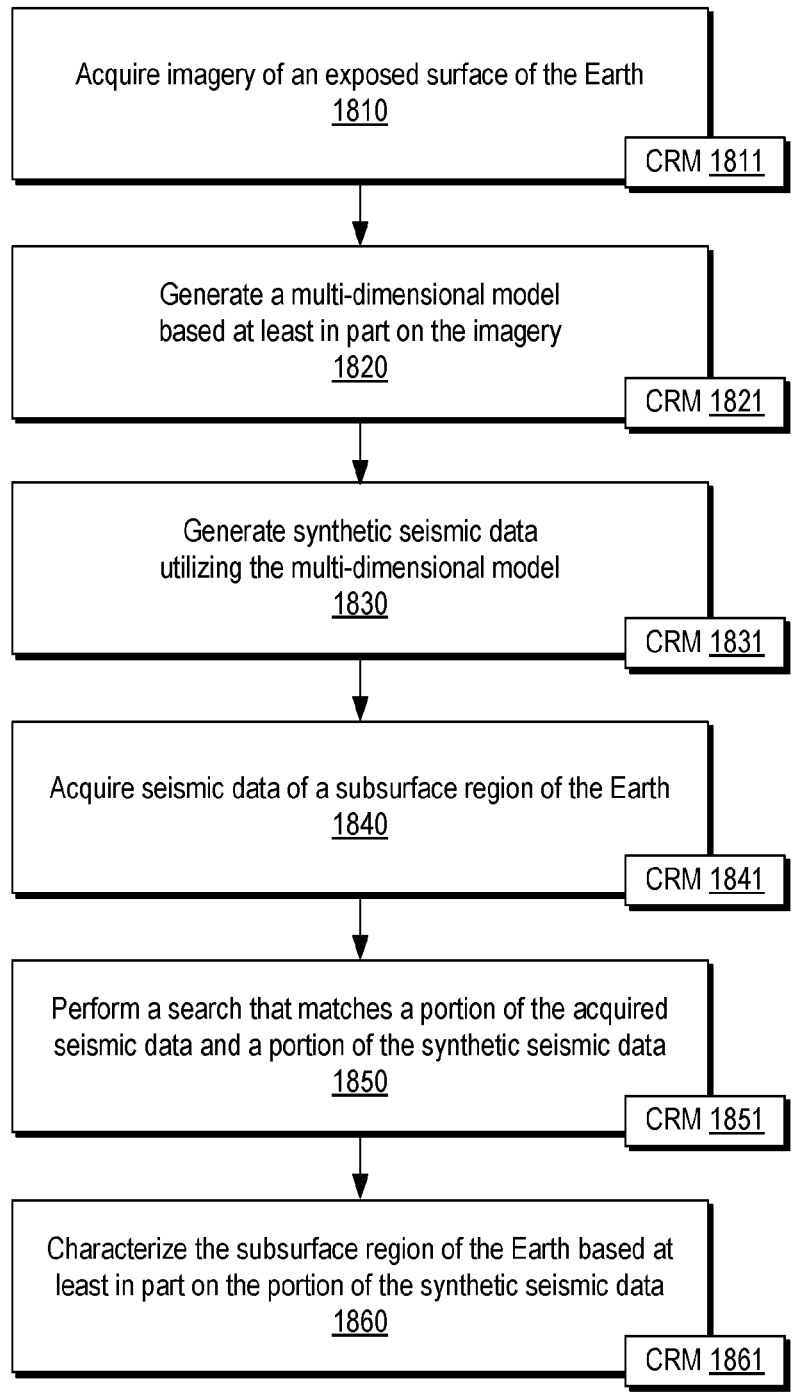
FIG. 18 illustrates an example of a method.

FIG. 18 shows an example of a method 1800 that includes an acquisition block 1810 for acquiring imagery of an exposed surface of the Earth; a generation block 1820 for generating a multi-dimensional model based at least in part on the imagery; a generation block 1830 for generating synthetic seismic data utilizing the multi-dimensional model; an acquisition block 1840 for acquiring seismic data of a subsurface region of the Earth; a performance block 1850 for performing a search that matches a portion of the acquired seismic data and a portion of the synthetic seismic data; and a characterization block 1860 for characterizing the subsurface region of the Earth based at least in part on the portion of the synthetic seismic data. In such an example, the method 1800 can include rendering a visualization of the characterized subsurface region to a display where, for example, the rendered subsurface region is characterized with greater accuracy due in part to the synthetic seismic data. As mentioned, such an approach can increase accuracy of an interpretation process where synthetic seismic data may be at a higher resolution than acquired seismic data (see, e.g., the resolution gap of the plot 1300 of FIG. 13). As an example, a characterized subsurface region may be utilized for purposes of simulation such as, for example, reservoir simulation (e.g., flow simulation via a simulator such as the ECLIPSE® simulator, the INTERSECT® simulator, etc.). Such an approach can enhance one or more field operations (e.g., as may be associated with production, injection, etc.). As an example, characterizing can include assigning properties to one or more portions of a model of a subsurface region based at least in part on information from one or more analogues.

FIG. 18 also shows various computer-readable medium (CRM) blocks 1811, 1821, 1831, 1841, 1851, and 1861 as associated with the blocks 1810, 1820, 1830, 1840, 1850, and 1860. Such blocks can include instructions that are executable by one or more processors, which can be one or more processors of a computational framework, a system, a computer, etc. A computer-readable medium can be a computer-readable storage medium that is not a signal, not a carrier wave and that is non-transitory. For example, a computer-readable medium can be a physical memory component that can store information in a digital format. Where a CRM is part of a computing system or otherwise operatively coupled to a computing system, the system is a specialized system that can perform the method 1800 of FIG. 18.

Figure 19:
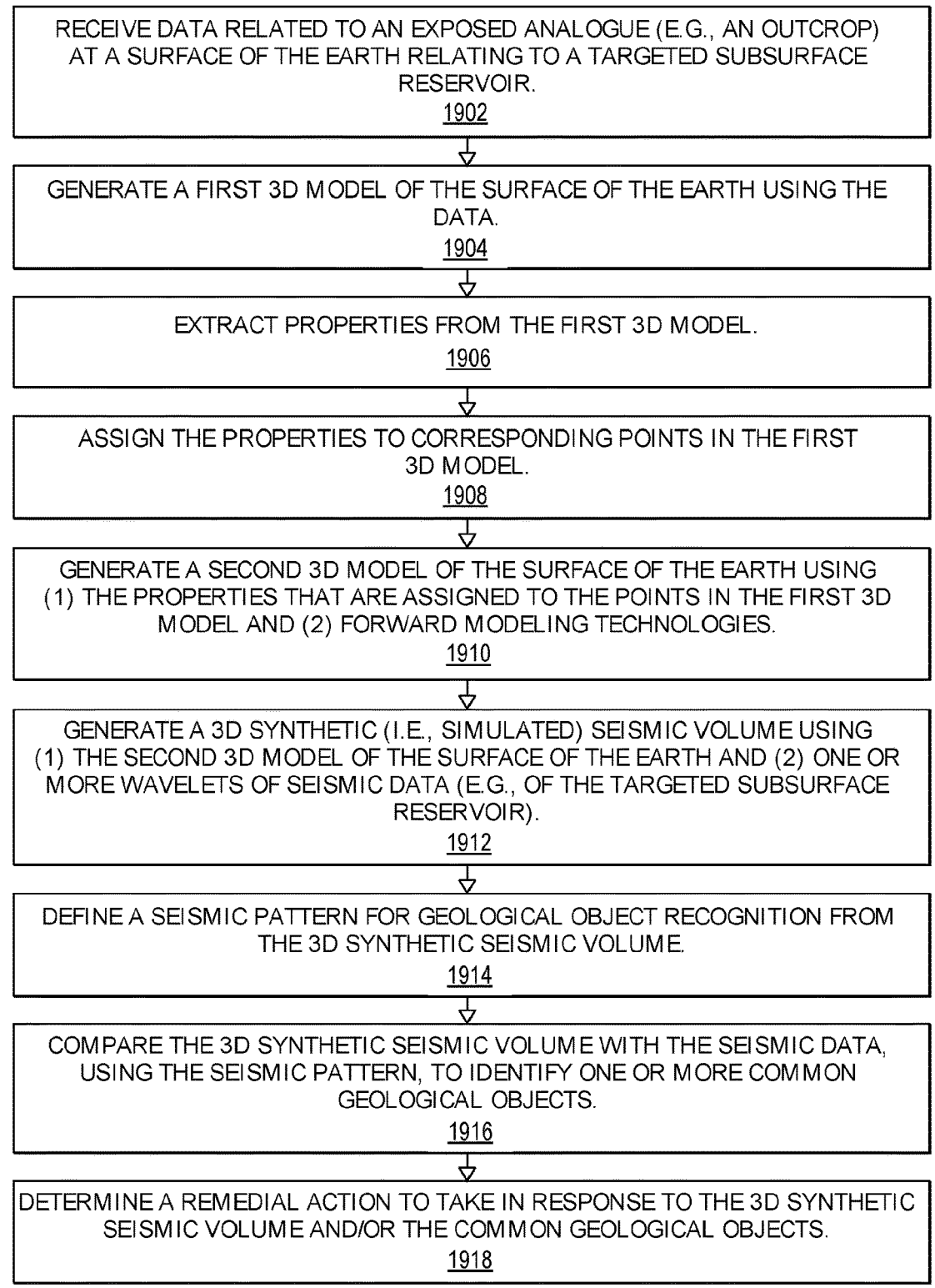
FIG. 19 illustrates an example of a method.

FIG. 19 illustrates a flowchart of a method 1900 for modelling a subsurface reservoir, according to an embodiment. The method 1900 includes acquiring/receiving data related to an exposed analogue (e.g., an outcrop) at a surface of the Earth relating to (e.g., above) a targeted subsurface reservoir, as at 1902. The data may be a photogrammetric-derived 3D point cloud (i.e. a cloud of points) that is derived from one or more pictures acquired by a drone and/or from a light detection scanner (i.e., LIDAR). The data may be acquired from the ground or from the air. The data may be geo-referenced, meaning that each at least some points in the data may be assigned a corresponding 2D, 3D, or 4D geographical reference point.

The method 1900 also includes generating a first 3D model (e.g., a 3D textured model) of the surface of the Earth using the acquired data (i.e. the 3D point cloud), as at 1904. The first 3D model may be or include a textured triangular mesh or grid derived from the 3D point cloud.

The method 1900 also includes (e.g., automatically) extracting and/or determining properties from the first 3D model, as at 1906. An extracted/determined portion of the first 3D model can include extracted/determined 3D beds of rock (e.g., beds of similar sedimentology, bounded by horizontal discontinuities) and faults and fractures (e.g., vertical discontinuities), according to an embodiment.

Properties may be extracted/determined using automated interpretation techniques. The properties may be geometric (e.g., edge, normal vector field components, dip, azimuth, rugosity) and/or color-based (e.g., RGB content analysis of the rock). The extracted/determined properties may be used for structural (e.g., faults) and stratigraphic (e.g., lithological) characterizations and interpretation of the surface of the Earth (i.e., the outcrop).

The method 1900 also includes assigning the one or more properties to corresponding points in the first 3D model, as at 1908. The points and/or the properties may be geo-referenced, which may allow the properties to be assigned to the corresponding points.

The method 1900 also includes generating a second 3D model (e.g., a 3D geological model) of the surface of the Earth using (1) the one or more properties that are assigned to the points in the first 3D model and (2) forward modeling technologies, as at 1910. The forward modeling technologies may simulate geological (e.g., sedimentary, diagenetic, and structural) processes responsible for the genesis of the exposed analogue. The forward modeling technologies may be constrained by additional properties of the surface of the Earth that may be physically-measured (e.g., by a geologist in the field) and/or derived from publications. The additional properties may include the sediment source location, the composition of the sediments, sea-level variations through geological time, syn-sedimentary tectonic history, paleotopography, paleobathymetry, or a combination thereof.

The method 1900 also includes generating a 3D synthetic (i.e., simulated) seismic volume model using (1) the second 3D model of the surface of the Earth and (2) one or more wavelets of seismic data (e.g., of the targeted subsurface reservoir), as at 1912. The output of the forward modeling technologies is populated with seismic velocities and a set of reflection coefficients are computed. The wavelet(s) extracted from the subsurface seismic volume is/are received and used for the convolutional modeling that produces the synthetic seismic volume. The synthetic seismic modeling can be performed with the use of different algorithms.

A 3D synthetic seismic volume model can include a geological object (e.g., a fluvial channel, etc.), according to an embodiment. The wavelets of seismic data may be received, extracted, and/or built by the use of different methods (e.g., analytical, statistical, or deterministic) and can be constrained by well logs (captured by a downhole tool), if available. The aim is to generate a wavelet by deconvolving the seismic trace with a set of reflection coefficients. One solution to do so is to use the wavelet toolbox that is part of PETREL®. The 3D synthetic seismic volume model may be the seismic analogue of the subsurface seismic targeted for reservoir characterization analysis.

The method 1900 also includes defining/determining a seismic pattern for geological object recognition from the 3D synthetic seismic volume model, as at 1914. The seismic pattern may be defined from the 3D synthetic seismic volume model and constrained by the exposed analogue (i.e. the outcrop). The objects may be or include structural, stratigraphic, and/or sedimentological features in the subsurface seismic volume model (e.g., faulting patterns, sedimentary systems, channels, and/or distribution of sediments).

The method 1900 also includes comparing the 3D synthetic seismic volume model with the seismic data (e.g., the same seismic data that included the wavelets), using the seismic pattern, to identify one or more common geological objects/features, as at 1916. An exposed analogue (i.e., the outcrop) can include a geological object (e.g., a fluvial channel, etc.), according to an embodiment. A comparison may be based on seismic coded technology (e.g., genetic type of coding). Once the common geological objects are identified, the user has an observed object (e.g., from the outcrop). In this example, the observed object is a channel. The user also has a corresponding seismic signature/property (e.g., from the 3D synthetic seismic volume model build by convolving the wavelet with the output of the geological process modeling tool). This may allow the user to query such objects within the full targeted subsurface 3D seismic dataset and automatically extract all such objects.

The method 1900 also includes determining a remedial action to take in response to the 3D synthetic seismic volume model and/or the common geological objects, as at 1918. The remedial action may be a physical, real-world action, which may be based on the extraction of identified geological objects as 3D volumes, property population of such 3D volumes constrained by the knowledge, and/or the properties analysis derived from the exposed analogue and the 3D synthetic seismic volume model. The remedial action may be or include, but is not limited to, well planning (e.g., for exploration purposes), well placement (e.g., well steering-while-drilling), field development planning, fluid flow modeling, and field management (e.g., injection and depletion). For example, the remedial action may include altering a trajectory of a downhole tool that is drilling a wellbore in the targeted subsurface reservoir. In another example, the remedial action may include adjusting a rate and/or composition of a fluid being pumped into the wellbore.

Figure 20:
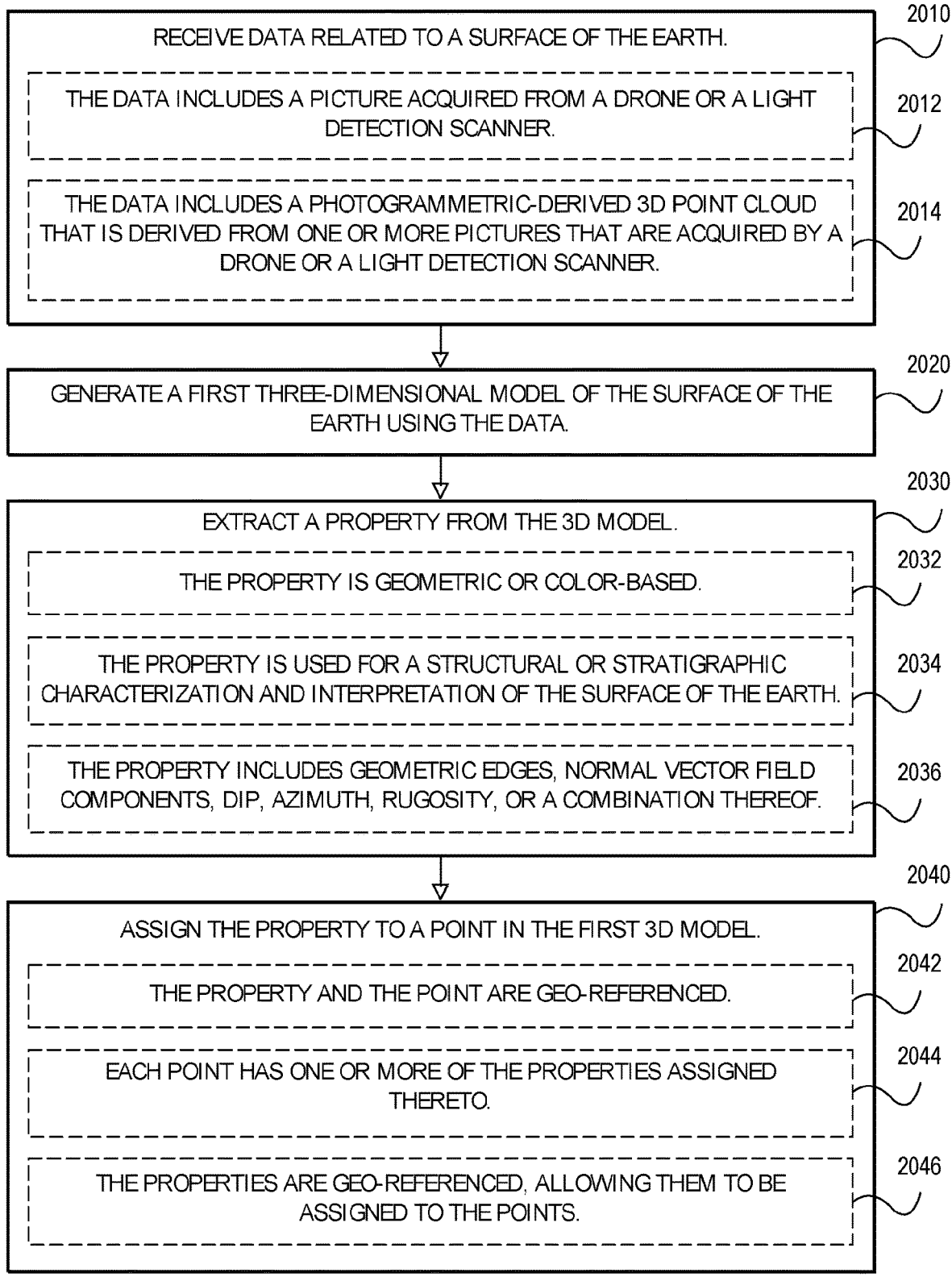
FIG. 20 illustrates an example of a method.
Figure 21:
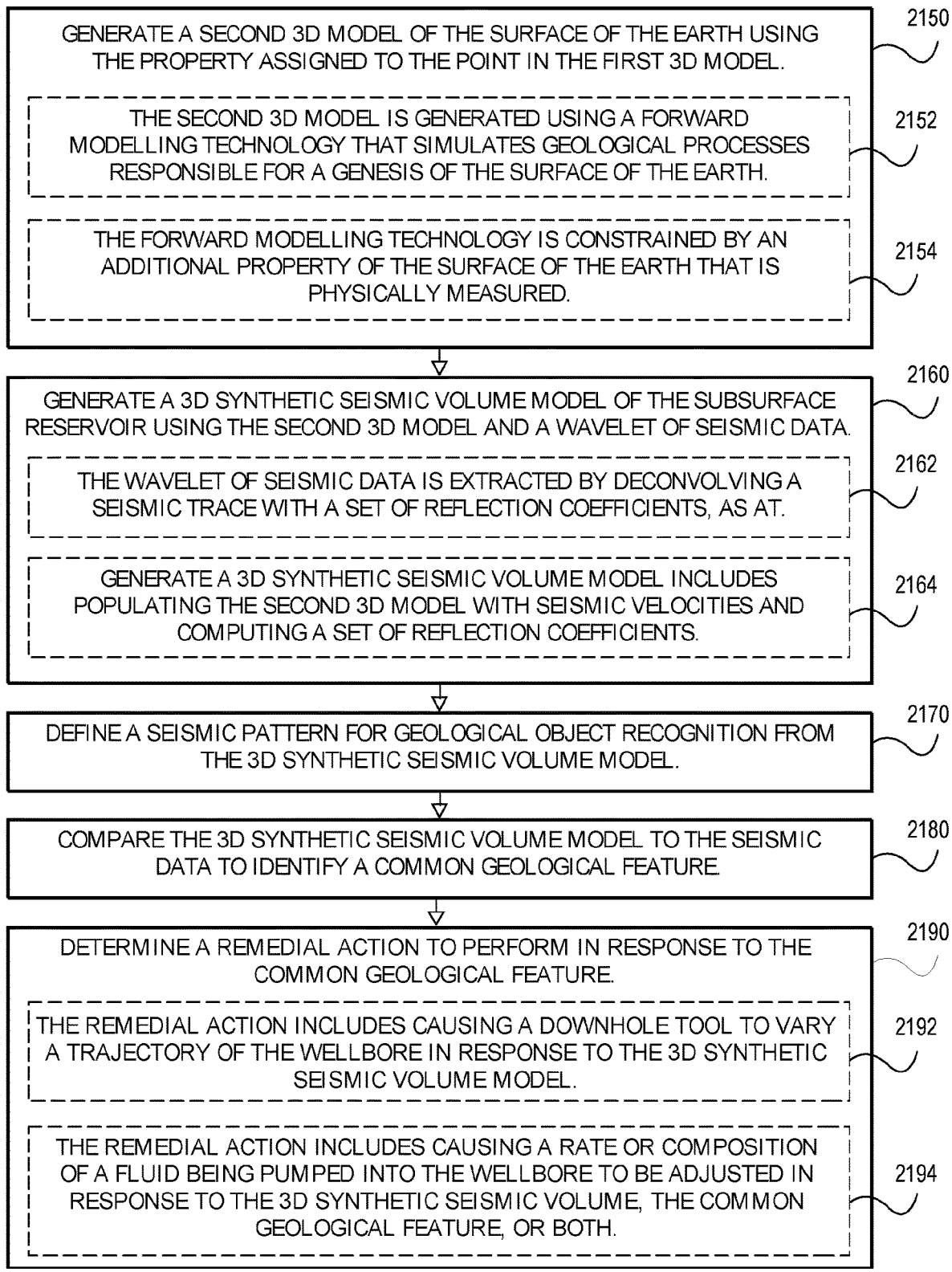
FIG. 21 illustrates an example of a method.

FIGS. 20 and 21 illustrate flowcharts of methods 2000 and 2100, which may be performed in combination, for modelling a subsurface reservoir, according to an embodiment. It will be appreciated that the flowcharts depict an example of how a method or methods may be performed. The illustrated aspects of the methods 2000 and 2100 may be combined, separated, or performed in an order that is different than that illustrated.

The method 2000 includes receiving data related to a surface of the Earth, as at 2010 (e.g., FIG. 19, 1902, receiving data related to an exposed analogue at a surface of the Earth). The data may include a picture acquired from a drone or a light detection scanner, as at 2012. The data may include a photogrammetric-derived 3D point cloud that is derived from one or more pictures that are acquired by a drone or a light detection scanner, as at 2014.

The method 2000 also includes generating a first three-dimensional model of the surface of the Earth using the data, as at 2020 (e.g., FIG. 19, 1904, generating a first 3D model of the surface of the Earth using the data).

The method 2000 also includes extracting and/or determining a property from the 3D model, as at 2030 (e.g., FIG. 19, 1906, extracting/determining properties from the first 3D model). The property may be geometric or color-based, as at 2032. The property may be used for a structural or stratigraphic characterization and interpretation of the surface of the Earth, as at 2034. The property may include geometric edges, normal vector field components, dip, azimuth, rugosity, or a combination thereof, as at 2036.

The method 2000 also includes assigning the property to a point in the first 3D model, as at 2040 (e.g., FIG. 19, 1908, assigning the properties to corresponding points in the first 3D model). The property and the point may be geo-referenced, as at 2042. Each point may have one or more of the properties assigned thereto, as at 2044. The properties may be geo-referenced, allowing them to be assigned to the points, as at 2046.

As to the method 2100 it includes generating a second 3D model of the surface of the Earth using the property assigned to the point in the first 3D model, as at 2150 (e.g., FIG. 19, 1910, generating a second 3D model of the surface of the Earth using (1) the properties that are assigned to the points in the first 3D model and (2) forward modeling technologies). The second 3D model may be generated using a forward modelling technology that simulates geological processes responsible for a genesis of the surface of the Earth, as at 2152. The forward modelling technology may be constrained by an additional property of the surface of the Earth that is physically measured, and the additional property may be selected from the group consisting of a sediment source location, a composition of the sediment, a sea-level variation through geological time, a syn-sedimentary tectonic history, paleotopography, and paleobathymetry, as at 2154.

The method 2100 also includes generating a 3D synthetic seismic volume model of the subsurface reservoir using the second 3D model and a wavelet of seismic data, as at 2160 (e.g., FIG. 19, 1912, generating a 3D synthetic seismic volume using (1) the second 3D model of the surface of the Earth and (2) one or more wavelets of seismic data). The wavelet of seismic data may be extracted by deconvolving a seismic trace with a set of reflection coefficients, as at 2162. Generating a 3D synthetic seismic volume model may include populating the second 3D model with seismic velocities and computing a set of reflection coefficients, as at 2164.

The method 2100 also includes defining a seismic pattern for geological object recognition from the 3D synthetic seismic volume model, as at 2170 (e.g., FIG. 19, 1914, defining a seismic pattern for geological object recognition from the 3D synthetic seismic volume).

The method 2100 also includes comparing the 3D synthetic seismic volume model to the seismic data to identify a common geological feature, as at 2180 (e.g., FIG. 19, 1916, comparing the 3D synthetic seismic volume with the seismic data, using the seismic pattern, to identify one or more common geological objects).

The method 2100 also includes determining a remedial action to perform in response to the common geological feature, as at 2190 (e.g., FIG. 19, 1918, determining a remedial action to take in response to the 3D synthetic seismic volume and/or the common geological objects). The remedial action may include causing a downhole tool to vary a trajectory of the wellbore in response to the 3D synthetic seismic volume model, as at 2192. The remedial action may include causing a rate or composition of a fluid being pumped into the wellbore to be adjusted in response to the 3D synthetic seismic volume, the common geological feature, or both, as at 2194.

As an example, a method for modelling a subsurface reservoir, can include receiving data related to a surface of the Earth; generating a first three-dimensional (3D) model of the surface of the Earth using the data; determining a property from the first 3D model; assigning the property to a point in the first 3D model; generating a second 3D model of the surface of the Earth using the property assigned to the point in the first 3D model; and generating a 3D synthetic seismic volume model of the subsurface reservoir using the second 3D model and a wavelet of seismic data. In such an example, the data can include an image acquired from a drone or from a light detection scanner (e.g., a digital image, which may be a pixel image in black and white, grayscale, color, etc.).

As an example, a property can be geometric and/or color-based (e.g., or intensity-based, pattern-based, etc.). As an example, a machine learning framework may be utilized to identify properties from imagery. In such an example, the properties may be utilized to enhance characterization of a subsurface region, for example, as interpreted via seismic data of a seismic survey, etc. As an example, a machine learning framework can include one or more trained neural networks that can classify features present in imagery and, for example, match such features with features in a subsurface region of the Earth (e.g., via a link established through seismic data, etc.).

As an example, a property can be used for a structural or stratigraphic interpretation of a surface region of the Earth (e.g., above water, underwater, etc.) and/or a subsurface region of the Earth. As an example, an exposed region of the Earth may be exposed yet in part or wholly underwater. Underwater imagery may be utilized to generate data as to one or more analogues.

As an example, a property and a point can be geo-referenced (e.g., with respect to one or more coordinate systems).

As an example, a second 3D model may be generated using a forward modelling technology that simulates geological processes responsible for a genesis of the surface of the Earth. In such an example, the forward modelling technology may be constrained by an additional property of the surface of the Earth that is physically measured and where, for example, the additional property is selected from the group consisting of: a sediment source location, a composition of the sediment, a sea-level variation through geological time, a syn-sedimentary tectonic history, paleotopography, and paleobathymetry.

As an example, a wavelet of seismic data may be determined by deconvolving a seismic trace with a set of reflection coefficients. As an example, a framework may be utilized for processing seismic data and/or generating synthetic seismic data (e.g., consider a framework with one or more features of the OMEGA® framework).

As an example, a method can include defining a seismic pattern for geological object recognition from the 3D synthetic seismic volume model; and comparing the 3D synthetic seismic volume model to the seismic data to identify a common geological feature. In such an example, coding may be utilized to expedite comparing, which may include matching. As an example, a machine learning framework can include one or more trained neural networks that can facilitate comparing for purposes of identifying one or more geological features. As an example, a method can include determining a remedial action to perform in response to the common geological feature.

As an example, a computing system can include one or more processors; and a memory system that includes one or more non-transitory computer-readable storage media (e.g., CRM) that can store instructions that, when executed by at least one of the one or more processors, cause the computing system to perform operations. Such operations may include, for example, receiving data related to a surface of the Earth; generating a first three-dimensional (3D) model of the surface of the Earth using the data; determining a property from the first 3D model; assigning the property to a point in the first 3D model; generating a second 3D model of the surface of the Earth using the property assigned to the point in the first 3D model; and generating a 3D synthetic seismic volume model of the subsurface reservoir using the second 3D model and a wavelet of seismic data.

As an example, data can include a photogrammetric-derived 3D point cloud that is derived from one or more pictures that are acquired by a drone, a light detection scanner, or other surface imaging technology.

As an example, a system can generate a second 3D model, for example, using a forward modelling technology that simulates geological processes responsible for a genesis of the surface of the Earth where, for example, the forward modelling technology is constrained by an additional property of the surface of the Earth that is physically measured.

As an example, a system can provide for generating a 3D synthetic seismic volume model of a subsurface reservoir using a second 3D model and a wavelet of seismic data, for example, with populating the second 3D model with seismic velocities and computing a set of reflection coefficients.

As an example, various operations of a method or controllable by a system issuing one or more signals, commands, etc., can include causing a downhole tool to vary a trajectory of a wellbore in response to a 3D synthetic seismic volume model and/or a model that is based at least in part on synthetic seismic data (e.g., an analogue enhanced model of a subsurface region of the Earth).

As an example, a non-transitory computer-readable storage media that stores instructions that, when executed by one or more processors of a computer system, cause the computer system to perform operations, can provide for performance of operations such as receiving data related to a surface of the Earth; generating a first three-dimensional (3D) model of the surface of the Earth using the data; determining a plurality of different properties from the first 3D model; assigning the properties to a plurality of points in the first 3D model; generating a second 3D model of the surface of the Earth using the properties assigned to the points in the first 3D model; generating a 3D synthetic seismic volume model of the subsurface reservoir using the second 3D model and a wavelet of seismic data; defining a seismic pattern for geological object recognition from the 3D synthetic seismic volume model; and comparing the 3D synthetic seismic volume model to the seismic data to identify a common geological feature. In such an example, the properties can include geometric edges, normal vector field components, dip, azimuth, rugosity, or a combination thereof. As an example, each point can have one or more of the properties assigned thereto. As an example, the properties can be geo-referenced, allowing them to be assigned to the points. As an example, operations can include causing a rate or composition of a fluid being pumped into the wellbore to be adjusted in response to the 3D synthetic seismic volume model, the common geological feature, or both.

As an example, a method can include acquiring imagery of an exposed surface of the Earth; generating a multi-dimensional model based at least in part on the imagery; generating synthetic seismic data utilizing the multi-dimensional model; acquiring seismic data of a subsurface region of the Earth; performing a search that matches a portion of the acquired seismic data and a portion of the synthetic seismic data; and characterizing the subsurface region of the Earth based at least in part on the portion of the synthetic seismic data. In such an example, the exposed surface of the Earth can be an outcrop.

As an example, imagery can be or include photographic imagery. As an example, imagery can be or include LIDAR imagery.

As an example, a spatial resolution of imagery can exceed a spatial resolution of acquired seismic data. As an example, a spatial resolution of the synthetic seismic data exceeds a spatial resolution of the acquired seismic data.

As an example, generating a multi-dimensional model can include generating a mesh model that is draped with at least a portion of acquired imagery. As an example, generating a multi-dimensional model can include assigning layers based at least in part on acquired imagery. For example, consider layers as may be associated with stratigraphy, which may be classified with respect to time, diagenetics, etc.

As an example, generating a multi-dimensional model can include geological process modeling. For example, geological process modeling may be implemented to generate a multi-dimensional model in a time that differs from a time of acquired imagery. In such an example, the time of the multi-dimensional model that is generated may be a prior time or a future time. Such time-shifting (e.g., time morphing via one or more geological processes) may be utilized to understand better acquired seismic data of a formation that is imaged using reflection seismology in a present time.

As an example, a method can include coding at least a portion of generated synthetic seismic data and performing a search based at least in part on the coding. As an example, a method can include coding at least a portion of acquired seismic data and performing the search based at least in part on the coding. As an example, a method can include coding synthetic seismic data and acquired seismic data. Such a method may utilize coding to facilitate searching, which can involve matching (e.g., closest matching, etc.) synthetic and real (e.g., acquired) seismic data.

As an example, a system can include a processor; memory operatively coupled to the processor; and processor-executable instructions stored in the memory to instruct the system to: acquire imagery of an exposed surface of the Earth; generate a multi-dimensional model based at least in part on the imagery; generate synthetic seismic data utilizing the multi-dimensional model; acquire seismic data of a subsurface region of the Earth; perform a search that matches a portion of the acquired seismic data and a portion of the synthetic seismic data; and characterize the subsurface region of the Earth based at least in part on the portion of the synthetic seismic data.

As an example, one or more computer-readable storage media can include computer-executable instructions executable to instruct a computing system to perform a method, which may be, for example, a method as described herein (see, e.g., the method 800 of FIG. 8, the method 1800 of FIG. 18, etc.).

As an example, a workflow may be associated with various computer-readable medium (CRM) blocks. Such blocks generally include instructions suitable for execution by one or more processors (or cores) to instruct a computing device or system to perform one or more actions. As an example, a single medium may be configured with instructions to allow for, at least in part, performance of various actions of a workflow. As an example, a computer-readable medium (CRM) may be a computer-readable storage medium that is non-transitory, not a carrier wave and not a signal. As an example, blocks may be provided as one or more sets of instructions, for example, such as the one or more sets of instructions 270 of the system 250 of FIG. 2.

Figure 22:
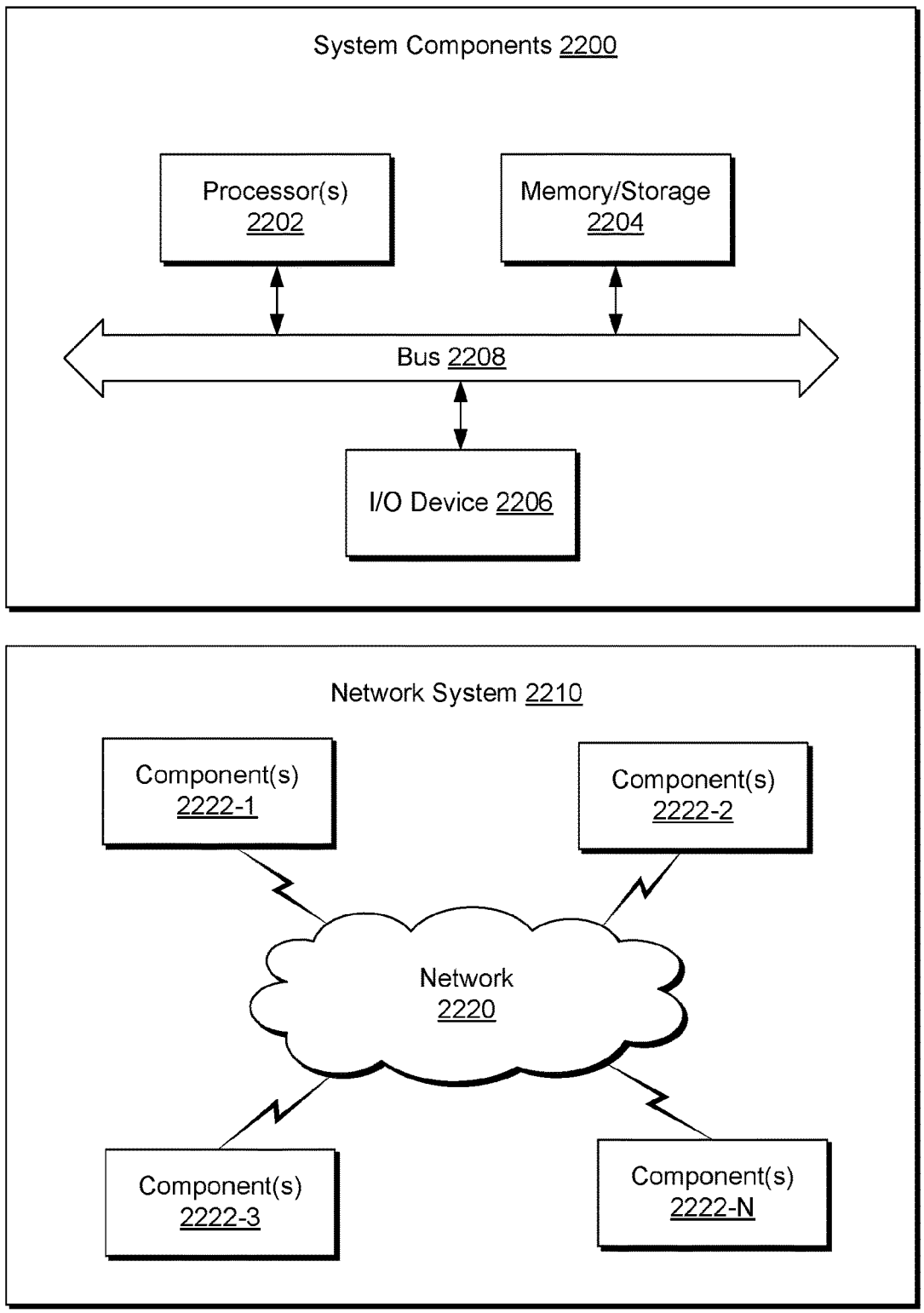
FIG. 22 illustrates example components of a system and a networked system.

FIG. 22 shows components of an example of a computing system 2200 and an example of a networked system 2210. The system 2200 includes one or more processors 2202, memory and/or storage components 2204, one or more input and/or output devices 2206 and a bus 2208. In an example embodiment, instructions may be stored in one or more computer-readable media (e.g., memory/storage components 2204). Such instructions may be read by one or more processors (e.g., the processor(s) 2202) via a communication bus (e.g., the bus 2208), which may be wired or wireless. The one or more processors may execute such instructions to implement (wholly or in part) one or more attributes (e.g., as part of a method). A user may view output from and interact with a process via an I/O device (e.g., the device 2206). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2210. The network system 2210 includes components 2222-1, 2222-2, 2222-3, . . . 2222-N. For example, the components 2222-1 may include the processor(s) 2202 while the component(s) 2222-3 may include memory accessible by the processor(s) 2202. Further, the component(s) 2202-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
acquiring imagery of an exposed surface of the Earth that comprises an exposed geological feature;
generating a multi-dimensional model based at least in part on the imagery;
generating synthetic seismic data utilizing the multi-dimensional model;
acquiring seismic data of a subsurface region of the Earth that comprises a subsurface geological feature;
performing a search that matches a portion of the acquired seismic data and a portion of the synthetic seismic data; and
characterizing the subsurface region of the Earth based at least in part on the portion of the synthetic seismic data.

2. The method of claim 1 wherein the exposed surface of the Earth is an outcrop.

3. The method of claim 1 wherein the imagery comprises photographic imagery.

4. The method of claim 1 wherein the imagery comprises LIDAR imagery.

5. The method of claim 1 wherein a spatial resolution of the imagery exceeds a spatial resolution of the acquired seismic data.

6. The method of claim 1 wherein a spatial resolution of the synthetic seismic data exceeds a spatial resolution of the acquired seismic data.

7. The method of claim 1 wherein generating the multi-dimensional model comprises generating a mesh model that is draped with at least a portion of the imagery.

8. The method of claim 1 wherein generating the multi-dimensional model comprises assigning layers based at least in part on the imagery.

9. The method of claim 1 wherein generating the multi-dimensional model comprises geological process modeling.

10. The method of claim 9 wherein the geological process modeling generates the multi-dimensional model in a time that differs from a time of the acquired imagery.

11. The method of claim 1 comprising rendering at least one graphical user interface to a display that comprises an image based at least in part on the acquired seismic data.

12. The method of claim 1 comprising coding at least a portion of the generated synthetic seismic data and performing the search based at least in part on the coding.

13. The method of claim 1 comprising coding at least a portion of the acquired seismic data and performing the search based at least in part on the coding.

14. The method of claim 1, wherein the exposed geological feature is an analogue for the subsurface geological feature.

15. A system comprising:
a processor;
memory operatively coupled to the processor; and
processor-executable instructions stored in the memory to instruct the system to: acquire imagery of an exposed surface of the Earth that comprises an exposed geological feature;
generate a multi-dimensional model based at least in part on the imagery;
generate synthetic seismic data utilizing the multi-dimensional model;
acquire seismic data of a subsurface region of the Earth that comprises a subsurface geological feature;
perform a search that matches a portion of the acquired seismic data and a portion of the synthetic seismic data; and
characterize the subsurface region of the Earth based at least in part on the portion of the synthetic seismic data.

16. The system of claim 15, further comprising processor-executable instructions stored in the memory to instruct the system to:
render at least one graphical user interface to a display that comprises an image based at least in part on the acquired seismic data;
code at least a portion of: the generated synthetic seismic data, and the acquired seismic data; and
perform the search based at least in part on the code, wherein: the exposed surface of the Earth is an outcrop, the imagery comprises imagery selected from the group consisting of photographic imagery and LIDAR imagery, a spatial resolution of the imagery exceeds a spatial resolution of the acquired seismic data, a spatial resolution of the synthetic seismic data exceeds a spatial resolution of the acquired seismic data, and
wherein, to generate the multi-dimensional model includes performance of geological process modeling and generation of a mesh model that is draped with at least a portion of the imagery.

17. One or more non-transitory, computer-readable storage media comprising computer-executable instructions executable to instruct a computing system to:
acquire imagery of an exposed surface of the Earth that comprises an exposed geological feature;
generate a multi-dimensional model based at least in part on the imagery;
generate synthetic seismic data utilizing the multi-dimensional model;
acquire seismic data of a subsurface region of the Earth that comprises a subsurface geological feature;
perform a search that matches a portion of the acquired seismic data and a portion of the synthetic seismic data; and
characterize the subsurface region of the Earth based at least in part on the portion of the synthetic seismic data.

18. The one or more non-transitory, computer-readable storage media of claim 17 further comprising computer-executable instructions executable to instruct a computing system to render at least one graphical user interface to a display that comprises an image based at least in part on the acquired seismic data.

* * * * *